(12) United States Patent
Aggarwal et al.

(10) Patent No.: US 12,146,758 B2
(45) Date of Patent: Nov. 19, 2024

(54) INTERFACING BETWEEN DIGITAL ASSISTANT APPLICATIONS AND NAVIGATION APPLICATIONS

(71) Applicant: Google LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/076,193

(22) PCT Filed: Aug. 1, 2018

(86) PCT No.: PCT/US2018/044756
§ 371 (c)(1),
(2) Date: Aug. 7, 2018

(87) PCT Pub. No.: WO2020/005304
PCT Pub. Date: Jan. 2, 2020

(65) Prior Publication Data
US 2021/0199458 A1 Jul. 1, 2021

Related U.S. Application Data

(60) Provisional application No. 62/690,049, filed on Jun. 26, 2018.

(51) Int. Cl.
| | | |
|---|---|---|
| *G01C 21/36* | (2006.01) | |
| *G06F 40/30* | (2020.01) | |
| *G06N 5/022* | (2023.01) | |

(52) U.S. Cl.
CPC ..... *G01C 21/3608* (2013.01); *G01C 21/3626* (2013.01); *G06F 40/30* (2020.01); *G06N 5/022* (2013.01)

(58) Field of Classification Search
CPC ............ G01C 21/3608; G01C 21/3626; G01C 21/3679; G06F 40/30; G06N 5/022; G10L 2015/228; G10L 2015/223; G10L 15/22
(Continued)

(56) References Cited

U.S. PATENT DOCUMENTS

| | | | |
|---|---|---|---|
| 2012/0117112 A1* | 5/2012 | Johnston | ............. G06F 16/9537 707/771 |
| 2017/0133010 A1 | 5/2017 | Printz | |
| 2018/0158455 A1 | 6/2018 | Georges | |

FOREIGN PATENT DOCUMENTS

| | | |
|---|---|---|
| CN | 102804181 | 11/2012 |
| CN | 107331389 | 11/2017 |

(Continued)

OTHER PUBLICATIONS

European Patent Office; Communication under Rule 71(3) EPC issued in Application No. 18753524.0; 85 pages; dated Apr. 7, 2021.
(Continued)

*Primary Examiner* — Maceeh Anwari
(74) *Attorney, Agent, or Firm* — Gray Ice Higdon

(57) ABSTRACT

The present disclosure is generally related to systems and methods of interfacing among multiple applications in a networked computer environment. A data processing system can access a navigation application to retrieve point locations within a reference frame corresponding to a geographic region displayed in a viewport of the navigation application. Each point location can have an identifier. The data processing system can parse an input audio signal to identify a request and a referential word. The data processing system can identify a point location within the reference frame based on the referential word parsed from the input audio signal and the identifier for the point location. The data processing system can generate an action data structure
(Continued)

including the point location identified. The data processing system can transmit the action data structure to the navigation application to initiate a navigation guidance process using the point location.

20 Claims, 6 Drawing Sheets

(58) Field of Classification Search
USPC .......................................................... 701/427
See application file for complete search history.

(56) References Cited

FOREIGN PATENT DOCUMENTS

| | | |
|---|---|---|
| EP | 3182303 | 6/2017 |
| EP | 3182303 A1 * | 6/2017 |
| JP | 2003150192 | 5/2003 |
| JP | 2009264796 | 11/2009 |
| JP | 2014065359 | 4/2014 |
| JP | 2016071865 | 5/2016 |
| JP | 2016529580 | 9/2016 |
| WO | WO2016200381 A1 * | 6/2015 |

OTHER PUBLICATIONS

Foreign Search Report and Written Opinion of PCT/US2018/044756 dated Mar. 20, 2019 (18 pages).
Japanese Patent Office; Notice of Reasons for Rejection issued in App. No. 2020-569967, 4 pages, dated Apr. 25, 2022.
Japanese Office Action; Notice of Reasons for Rejection issued in Application No. 2020-569967, 8 pages, dated Feb. 14, 2022.
Japanese Patent Office; Notice of Allowance issued in App. No. 2020-569967, 3 pages, dated Oct. 11, 2022.
China National Intellectual Property Administration; Grant Notice issued in Application No. 201880028321.9; 6 pages; dated Jul. 31, 2023.
Korean Patent Office; Notice of Office Action issued in Application No. 10-2021-7002453; 7 pages; dated Jan. 26, 2023.
China National Intellectual Property Administration; Notification of First Office Action issued in Application No. 201880028321.9; 37 pages; dated Dec. 29, 2022.

* cited by examiner

INTERFACING BETWEEN DIGITAL ASSISTANT APPLICATIONS AND NAVIGATION APPLICATIONS

CROSS REFERENCES TO RELATED APPLICATIONS

This application claims the benefit of priority under 35 U.S.C. § 371 to International Application No. PCT/US18/44756, titled "INTERFACING BETWEEN DIGITAL ASSISTANT APPLICATIONS AND NAVIGATION APPLICATIONS," filed Aug. 1, 2018, which claims the benefit of priority to U.S. Patent Provisional Application No. 62/690,049, titled "INTERFACING BETWEEN DIGITAL ASSISTANT APPLICATIONS AND NAVIGATION APPLICATIONS," filed Jun. 26, 2018, each of which is incorporated herein by reference in its entirety.

BACKGROUND

Digital assistant applications can operate in a networked computer environment in which processing associated with functionality provided at a client device is performed at a server connected to the client device by way of a network. The server can be provided with data associated with a request at the client device by way of the network. Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response when the responding computing device is at or above its processing capacity, which may result in inefficient bandwidth utilization, consumption of computing resources, and depletion of battery life. A portion of the excessive network transmissions can include transmissions for requests that are not valid requests. Additional challenges exist in the provision of a speech-based interface with applications that typically operate as a graphical user interface, particularly in such a networked environment in which it is desirable to minimize excessive network transmissions.

SUMMARY

According to an aspect of the disclosure, a system to interface among multiple applications in a networked computer environment can include a data processing system having one or more processors. A navigation interface component executed on the data processing system can access a navigation application executing on a first client device to retrieve a plurality of point locations within a reference frame corresponding to a geographic region displayed in a viewport of the navigation application. Each point location of the plurality of locations can have an identifier. A natural language processor component executed on the data processing system can receive an input audio signal detected by a sensor of at least one of the first client and a second client device. The natural language processor component can parse the input audio signal to identify a request and a referential word. The natural language processor component can identify, responsive to the identification of the request, a point location from the plurality of point locations within the reference frame based on the referential word parsed from the input audio signal and the identifier for the point location. An action handler component executed on the data processing system can generate an action data structure including the point location identified responsive to the detection of the input audio signal. The action handler component can transmit the action data structure to the first client device to cause the navigation application to initiate a navigation guidance process using the point location.

According to an aspect of the disclosure, a method of interfacing among multiple applications in a networked computer environment can include accessing a navigation application executing on a first client device to retrieve a plurality of point locations within a reference frame corresponding to a geographic region displayed in a viewport of the navigation application. Each point location of the plurality of locations can have an identifier. The method can include receiving an input audio signal detected by a sensor of at least one of the first client and a second client device. The method can include parsing the input audio signal to identify a request and a referential word. The method can include identifying, responsive to identifying the request, a point location from the plurality of point locations within the reference frame based on the referential word parsed from the input audio signal and the identifier for the point location. The method can include generating an action data structure including the point location identified responsive to the detection of the input audio signal. The method can include transmitting the action data structure to the first client device to cause the navigation application to initiate a navigation guidance process using the point location.

Each aspect may include one or more of the following features. The navigation interface component may access the navigation application to determine a first portion of the reference frame corresponding to the geographic region displayed concurrently to the receipt of the input audio signal and to determine a second portion of the reference frame corresponding to the geographic region previously displayed in the viewport based on a velocity of the first client device acquired from an inertial motion unit. The natural language processor component may identify the point location from the plurality of point locations within the reference frame based on a travel direction of at least one of the first client and the second client device determined using data from an inertial motion unit. The navigation interface component may access the navigation application to retrieve the plurality of point locations within the reference frame having a first portion corresponding to the geographic region and to a second geographic region within a defined proximity about a destination location of a path routing operation of the navigation guidance process; and the natural language processor component to: determine that the referential word is related to the second portion corresponding to the second geographic region and not to the first portion corresponding to the geographic region; and identify the point location from the plurality of point locations within the portion based on the determination that the referential word is related to the second portion. The navigation interface component may access the navigation application to retrieve a first location identifier of the first client device within the reference frame corresponding to the geographic region and a plurality of second location identifiers corresponding to the plurality of point locations within the reference frame; and the natural language processor component may identify the point location from the plurality of point locations based on the first location identifier of the first client device and the plurality of second location identifiers corresponding to the plurality of point locations. The navigation interface component may access the navigation application to retrieve a plurality of search terms received within a defined time window prior to the receipt of the input audio signal; and the natural language processor component may: determine, for each point location of the plurality of point locations and each search term of the plurality of search terms, a semantic distance between the identifier of the point location and the search term using a semantic knowledge graph; and select, for the identification of the point location, a subset of point locations from the plurality of point locations based on the plurality of semantic distances between the plurality of identifiers and the plurality of search terms. The natural language processor component may: parse the input audio signal to identify an auxiliary word different from the referential word; determine a subset area of the viewport of the navigation application based on the auxiliary word; and select, for the identification of the point location, a subset of point locations from the plurality of point locations corresponding to the subset area of the viewport determined based on the auxiliary word. The natural language processor component may: receive a second input audio signal detected by the sensor of at least one of the first client and the second client device; determine that a time elapsed between the receipt of the second input audio signal and the receipt of the input audio signal is less than a defined threshold; parse, responsive to the determination that the elapsed time is less than the defined threshold, the second input audio signal to identify a second referential word; select, for the identification of the point location, a subset of point locations from the plurality of point locations based on the second referential word. The natural language processor component may: determine, for each point location of the plurality of point location, an indexical measure between the referential word and the identifier for the point location, the indexical measure indicating a likelihood that the referential word denotes the identifier for the point location; and identify the point location from the plurality of point locations within the reference frame based on the plurality of indexical measures for the corresponding plurality of point locations. The natural language processor component may: determine, for each point location of the plurality of point locations, a semantic distance between the referential word and the identifier of the point location using a semantic knowledge graph; and identify the point location from the plurality of point locations within the reference frame based on the plurality of semantic distances for the corresponding plurality of point locations. The natural language processor component may determine a request type corresponding to a location finder operation of a plurality of operations to be performed by the navigation application based on the request; and the action handler component to generate the action data structure including the request type and to transmit the action data structure to the first client device to cause the navigation application to initiate the location finder operation of the navigational guidance process corresponding to the request type to present the point location in the geographic region displayed in the viewport. The natural language processor component may determine a request type corresponding to a path routing operation of a plurality of operations to be performed by the navigation application based on the request; and the action handler component to generate the action data structure including the request type and to transmit the action data structure to the first client device to cause the navigation application to initiate the path routing operation of the navigational guidance process corresponding to the request type to identify a travel path to the point location as a destination location. The action handler component may receive a response from the first client device executing the navigation application for at least one of a textual output or an output audio signal.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
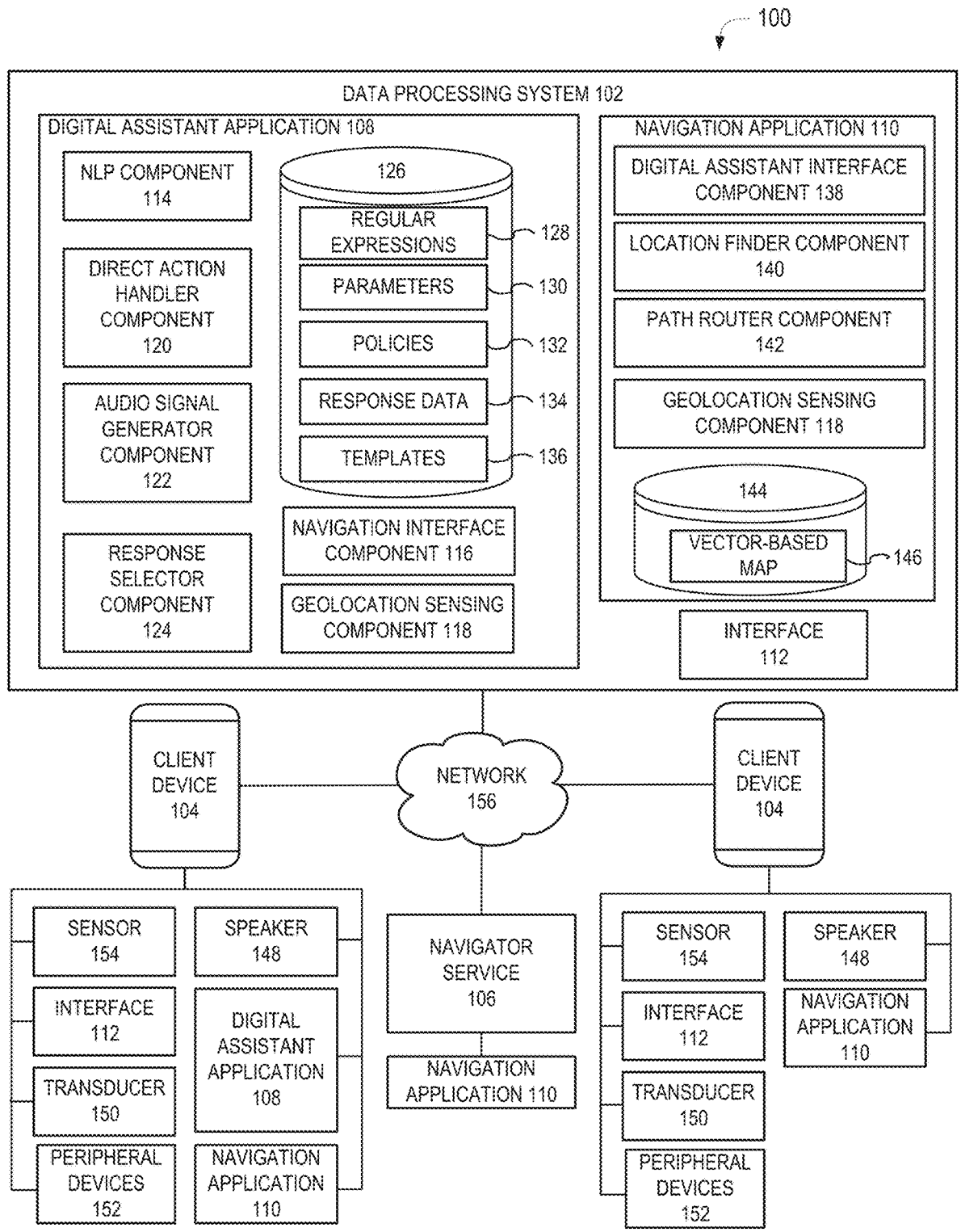
FIG. 1 illustrates a block diagram of an example system to interface among multiple applications in a networked computer environment, in accordance with an example of the present disclosure.

Following below are more detailed descriptions of various concepts related to and implementations of, methods, apparatuses, and systems to interface among multiple applications in a networked computer environment. The various concepts introduced above and discussed in greater detail below may be implemented in any of numerous ways.

A digital assistant application can interface with agents via exchanging application data and invoking functions in accordance with an application programming interface (API). Upon receipt of an input audio signal, the digital assistant application can parse the input audio signal to identify words from the input audio signal. The digital assistant application can determine that the words refer to a function of a particular agent. In response to this determination, the digital assistant application can invoke functions of the agent referred to in the input audio signal. Using the functions, the capabilities of the digital assistant application can be augmented.

One such agent can be a navigation application (sometimes referred to as a Global Positioning System (GPS) navigator). The navigation application can display a top-down view of a map of a geographic region via a viewport. The map can define elevation contours, water depth, regions, artificial features, and transportation networks (e.g., roads, pedestrian walkways, bike paths, and railways). The map can also include a multitude of point locations linked together via paths representing the transportation network. Each point location can refer to a point of interest on the vector map, such as a restaurant, a gas station, a landmark, a mountain, or a lake, among others. Each point location can be labeled with geographic coordinates and an identifier. The identifier can be a name or a descriptor of the point of interest. For example, a point location corresponding to a restaurant may have "ABC Pizzeria" as the name and "restaurant" and "pizza" as descriptors. Using zoom and viewing angle, the portion of the map visible through the viewport of the navigation application can be modified. In displaying the map, the navigation application can identify to a portion of the map that is visible through the viewport as the reference frame for the end-user.

The navigation application can also perform various navigation guidance functions with respect to the map displayed through the viewport. The navigation guidance functions of the navigation application can include a location finder operation and a path finding operation. The location operation can be invoked to a find a particular point of interest on the map. Under the location finder operation, the navigation application can receive a search term for points of interest on the map. Upon receipt, the navigation application can identify all the point locations with identifiers matching the search term that are visible through the viewport of the navigation application. The path finding operation can be invoked to determine a route from a current location to the point of interest of the map. In the path finding operation, the navigation application can identify a current location and the point location corresponding to the requested point of interest. The point location may have been identified using the search term matching the identifier for the point location visible through the viewport. The navigation application can apply a path finding algorithm to determine the route between the current location and the point location via the paths connecting the two as defined within the reference frame.

The difficulty with interfacing the digital assistant application with the navigation application may be that the digital assistant application relies on audio input and output signals whereas the navigation application may rely on visual presentation and input received by way of touch interaction with the visual presentation (e.g., via touch screen, keyboard, or mouse). In addition, the navigation application can have access to a current location or a current focus of the client device about which a reference frame for the client device can be recognized. In contrast, the digital assistant application may lack any factoring of the current location, the current focus, or the reference frame within the map accessible through the navigation application. Furthermore, the digital assistant application may not have access to the point locations and paths defined in the map that is visible through the viewport. Without access to data visible through the viewport of the navigation application or any consideration of the reference frame, the digital assistant application may be unable to determine which point location on the map a request identified from the input audio signal is referring to. Moreover, even if the request identified from parsing the input audio signal is converted to a textual input for the navigation application, the navigation application may be unable to distinguish which point location the textual input is referencing. The navigation application may lack natural language processing capabilities, thereby further exacerbating the inability to distinguish when the textual input is of natural language containing indexical or deictic words.

To address the technical challenges arising from interfacing, the digital assistant application can access the navigation application in response to a request in the input audio signal that references one of the functions of the navigation application. The digital assistant application can also determine which function the request in the input audio signal is referencing. For example, upon identifying the words "Take me there" from parsing the input audio signal, the digital assistant application can determine that the words "Take me" refer to the path finding operation of the navigation application. In another example, when the words "Show me gas stations" are parsed from the input audio signal, the digital assistant application can determine that the words "Show me" refer to the location finder operation of the digital assistant application. In accessing the navigation application, the digital assistant application can retrieve a set of point locations corresponding to the portion of the map visible through the viewport of the navigation application. The digital assistant application can also obtain the identifiers for each point location and a previous set of search terms used as inputs for the navigation application. The digital assistant application can also identify previously received requests referencing the functions of the navigation application. For example, the input audio signals with the phrase "Tell me about the ABC Tower" and with the phrase "Show me patisseries" may have been received in succession. The digital assistant application can use the phrase "Tell me about the ABC Tower" in processing the phrase "Show me patisseries" in establishing a region of interest to obtaining the identifiers.

The digital assistant application can use natural language processing techniques to determine a referential word from the set of words parsed from the input audio signal. The referential word can correspond to one of the points of interest on the map visible through the viewport of the navigation application. For example, for the phrase "take me there" parsed from an input audio signal, the referential word may be "there." For the phrase "let's go to the pizzeria," the referential word may be "pizzeria." Using the identifiers for the point locations visible through the viewport of the navigation application, the digital assistant application can identify which point location the referential word is referring to. The digital assistant application can compare the referential word with the identifier for each point location. In comparing, the digital assistant application can determine a semantic distance between the referential word and the identifier for each location using a semantic knowledge graph. The digital assistant application can also determine an indexical measure between the referential word and a previous word, such as the previously received requests or the search terms. Based on the comparisons, the digital assistant application can identify which point location the referential word of the input audio signal is referring to. Using the request and the identified point location, the digital assistant application can generate an action data structure to provide to the navigation application to carry out the indicated operation using the identified point location.

Resource intensive processing based upon natural language processing and interpretation can therefore be performed for a client device at a remote server in which information associated with a graphical user interface of the client device is taken into account. Subject matter described herein may therefore provide an interface between a graphical user interface of a client device and a speech-based system. The interface allows a user to interact with the graphical user interface using speech, and additionally allows data associated with the graphical user interface to be provided to a remote server efficiently. The speech-based system is thereby able to provide an improved guided interaction with a user of the client device.

Referring to FIG. 1, depicted is an example system 100 to interface among multiple applications in a networked computer environment. The system 100 can include at least one data processing system 102, one or more client devices 104, and one or more navigator services 106. The one or more client devices 104 can be communicatively coupled to the one or more navigator services 106, and vice-versa. The at least one data processing system 102, one or more client devices 104, and one or more navigator services 106 can be communicatively coupled to one another via the network 156.

The data processing system 102 can include an instance of the digital assistant application 108. The digital assistant application 108 can include a natural language processor (NLP) component 114 to parse audio-based inputs. The digital assistant application 108 can include a navigation interface component 116 to interface with a navigation application 110. The digital assistant application 108 can include a geolocation sensing component 118 to obtain position measurements. The digital assistant application 108 can include an audio signal generator component 122 to generate audio-based signals. The digital assistant application 108 can include a direct action handler component 120. The digital assistant application 108 can include a response selector component 124 to select responses to audio-based input signals. The NLP component 114, the audio signal generator component 122, the data repository 126, the direct action handler component 120, and the response selector component 124 separate from the digital assistant application 108. The data processing system 102 can include a data repository 126. The data repository 126 can store regular expressions 128, parameters 130, policies 132, response data 134, and templates 136.

The data processing system 102 can also include an instance of at least one navigation application 110 to perform navigation guidance processes, among others. The navigation guidance processes can include a location finding operation and a path routing operation, among others. The navigation application 110 can include a digital assistant interface component 138 to interface with the digital assistant application 108. The navigation application 110 can include a location finder component 140 to perform the location finding operation to search for a location in a geographic region using search terms. The navigation application 110 can include a path router component 142 to perform the path routing operation to determine a path from one location to another location in the geographic region. The functionalities of the location finder component 140 and the path router component 142 will be explicated herein below. The navigation application 110 can also include the instance of the geolocation sensing component 118 to obtain position measurements. The navigation application 110 can include or otherwise access at least one data repository 144. The navigation application 110 can be a separate application from the digital assistant application 108. The data processing system 102 can include an instance of one or more navigation applications 110.

The data repository 144 can store and maintain a vector-based map 146 accessible to one or more instances of the navigation application 110. The data repository 144 may be separate from the navigation application 110, and can be maintained on the data processing system 102 or the navigator services 106. At least a portion of the vector-based map 146 can be maintained on the client device 104 running the navigation application 110. The navigation application 110 can render and display a portion of the vector-based map 146 through a viewport of the navigation application 110. The viewport can correspond to an area of a display of the client device 104 running the navigation application 110 through which the portion of the vector-based map 146 is visible. As the vector-based map 146 can be larger in size than the viewport of the navigation application 110 or the display of client device 104, a portion corresponding to the viewport of the navigation application 110 can be displayed. The portions currently or previously displayed through the viewport of the navigation application 110 can be stored on the client device 104 running the navigation application 110. The vector-based map 146 can represent a geographic map (e.g., of the Earth) using a data structure (e.g., linked list, tree, array, matrix, and heap). The vector-based map 146 can include elevation contours, water depth, regions (e.g., of countries, provinces, counties, prefectures, cities, towns, and villages), natural features (e.g., lakes, mountains, and rivers), artificial features (e.g., buildings, parking lots, and parks), and/or transportation networks (e.g., roads, pedestrian walkways, bike paths, and railways), or a combination of these features. The vector-based map 146 can define the elevation contours, water depth, regions, artificial features, and transportation networks. The vector-based map 146 can include a set of point locations and a set of paths. The vector-based map 146 can define a geographic coordinate (e.g., longitude and latitude) for each point location. Each point location can correspond to one of the artificial features and natural features. Each point location can be associated with a geographic coordinate and can have one or more identifiers. The identifier of the point location can include a name and a category type for the point location. For example, for a point location corresponding to a hotel, the name may be "XYZ Inn" and the category type may be "hotel." The point locations can be linked to one another via paths. Each path can correspond to a transportation network, such as a road, a pedestrian walkway, bike path, and railways, among others. Each path can define a geographic distance (e.g., measured in kilometers or miles) among the point locations. The vector-based map 146 can be encoded in accordance with a geographic information encoding format (e.g., GIS).

The functionalities of the data processing system 102, such as the digital assistant application 108 and the navigation application 110, can be included or otherwise be accessible from the one or more client devices 104. The functionalities of the data processing system 102 may correspond to the functionalities or interface with the digital assistant application 108 executing on the client devices 104. The client devices 104 can each include and execute a separate instance of the one or more components of the digital assistant application 108. The client devices 104 can otherwise have access to the functionalities of the components of the digital assistant application 108 on a remote data processing system 102 via the network 156. For example, the client device 104 can include the functionalities of the NLP component 114 and access the remainder of the components of the digital assistant application 108 via the network 156 to the data processing system 102. The client devices 104 can each include and execute a separate instance of the one or more components of the navigation application 110. The client devices 104 can otherwise have access to the functionalities of the components of the navigation application 110 on a remote data processing system 102 via the network 156. For example, the client device 104 can include the functionalities of the location finder component 140 and the path router component 142 and can access the vector-based map 146 via the network 156.

The client devices 104 can each include at least one logic device such as a computing device having a processor to communicate with each other with the data processing system 102 via the network 156. The client devices 104 can include an instance of any of the components described in relation to the data processing system 102. The client devices 104 can include an instance of the digital assistant application 108. The client devices 104 can include a desktop computer, laptop, tablet computer, personal digital assistant, smartphone, mobile device, portable computer, thin client computer, virtual server, speaker-based digital assistant, or other computing device.

The components of the system 100 can communicate over a network 156. The network 156 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 156 can include a wireless link, such as an infrared channel or satellite band. The topology of the network 156 may include a bus, star, or ring network topology. The network 156 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The client device 104 can include, execute, interface, or otherwise communicate with one or more of at least one instance of the digital assistant application 108, at least one instance of the navigation application 110, at least one speaker 148, at least one sensor 154, at least one transducer 150, and at least one peripheral device 152. The sensor 154 can include, for example, a camera, an ambient light sensor, proximity sensor, temperature sensor, an inertial motion unit, accelerometer, gyroscope, motion detector, GPS sensor, location sensor, microphone, video, image detection, or touch sensor. The transducer 150 can include or be part of a speaker or a microphone. The client device 104 can include an audio driver. The audio driver can provide a software interface to the hardware transducer 150. The audio driver can execute the audio file or other instructions provided by the data processing system 102 to control the transducer 150 to generate a corresponding acoustic wave or sound wave. The peripheral device 152 can include user input/output devices, such as a keyboard, a display, and a headphone, among others. The display can include one or more hardware or software components configured to provide a visual indication or optical output, such as a light emitting diode, organic light emitting diode, liquid crystal display, laser, or display.

The instance of the digital assistant application 108 on the client device 104 can include or be executed by one or more processors, logic array, or memory. The instance of the digital assistant application 108 on the client device 104 can detect a keyword and perform an action based on the keyword. The digital assistant application 108 on the client device 104 can be an instance of the digital assistant application 108 executed at the data processing system 102 or can perform any of the functions of the digital assistant application 108. The instance of the digital assistant application 108 on the client device 104 can filter out one or more terms or modify the terms prior to transmitting the terms as data to the data processing system 102 (e.g., the instance of the digital assistant application 108 on the data processing system 102) for further processing. The instance of the digital assistant application 108 on the client device 104 can convert the analog audio signals detected by the transducer 150 into a digital audio signal and transmit one or more data packets carrying the digital audio signal to the data processing system 102 via the network 156. The instance of the digital assistant application 108 on the client device 104 can transmit data packets carrying some or the entire input audio signal responsive to detecting an instruction to perform such transmission. The instruction can include, for example, a trigger keyword or other keyword or approval to transmit data packets comprising the input audio signal to the data processing system 102.

The instance of the digital assistant application 108 on the client device 104 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The instance of the digital assistant application 108 on the client device 104 can apply the bandpass filter prior to transmitting the input audio signal to the data processing system 102, thereby reducing network bandwidth utilization. However, based on the computing resources available to the client device 104 and the available network bandwidth, it may be more efficient to provide the input audio signal to the data processing system 102 to allow the data processing system 102 to perform the filtering.

The instance of the digital assistant application 108 on the client device 104 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102 and manage rendering of a graphical user interface provided via the display.

The client device 104 can be associated with an end user that enters voice queries as audio input into the client device 104 (via the sensor 154 or transducer 150) and receives audio (or other) output from the data processing system 102 or navigator services 106 to present, display, or render to the end user of the client device 104. The digital component can include a computer-generated voice that can be provided from the data processing system 102 or the navigator service 106 to the client device 104. The client device 104 can render the computer-generated voice to the end user via the transducer 150 (e.g., a speaker). The computer-generated voice can include recordings from a real person or computer-generated language. The client device 104 can provide visual output via a display device communicatively coupled to the client device 104.

The end user that enters the voice queries to the client device 104 can be associated with multiple client devices 104. For example, the end user can be associated with a first client device 104 that can be a speaker-based digital assistant device, a second client device 104 that can be a mobile device (e.g., a smartphone), and a third client device 104 that can be a desktop computer. The data processing system 102 can associate each of the client devices 104 through a common login (e.g., account identifier and authentication credentials), location, network, or other linking data. For example, the end user may log into each of the client devices 104 with the same account user name and password.

The client device 104 can include or execute an instance of the navigation application 110. The client device 104 can include or execute an instance of the navigation application 110. The navigation application 110 can include one or more components with similar functionalities as the digital assistant application 108. Instances of the navigation application 110 can be executed on the data processing system 102 and the navigator service 106. The digital assistant application 108 can interface with the navigation application 110, and vice-versa to carry out predefined functions. The navigation application 110 can access resources on the navigator service 106 in carrying out the function indicated in the input audio signal. The client device 104 can receive an input audio signal detected by a sensor 154 (e.g., microphone) of the client device 104. Based on parsing the input audio signal, the digital assistant application 108 can determine which navigation application 110 to interface with in processing the input audio signal. The input audio signal can include, for example, a query, question, command, instructions, or other statement in a natural language. For example, the voice query can include a command to find a location in a geographic region. The digital assistant application 108 can determine that the voice query includes a command referencing at least one functionality of the navigation application 110. In response to the determination, the digital assistant application 108 can interface with the navigation application 110 to retrieve data to complete the task indicated in the voice query. The input audio signal can include one or more predefined keywords referencing a functionality of the navigation application 110 (e.g., "take," "find," and "route"). For example, the input audio signal can include "Take me to high school XYZ." From this query, the digital assistant application 108 can determine that the voice query is referencing the navigation application 110 as opposed to another agent or the functionality of the digital assistant application 108 itself. The digital assistant application 108 can determine that the voice query is referencing the functionality of the navigation application 110, and can perform processing using the voice query to generate a command to the navigation application 110. Upon receipt, the navigation application 110 can display or present portions of the vector-based map 146 based on the command generated using the voice query. The functionalities of the navigation application 110 with respect to the navigator service 106 and the digital assistant application 108 will be detailed herein below.

The digital assistant application 108 executing on a first client device 104 without the navigation application 110 can access the navigation application 110 running on a second client device 104. In response to determining that the voice query references at least one functionality of the navigation application 110, the digital assistant application 108 executing on the first client device 104 can identify that the first client device 104 lacks the navigation application 110. The digital assistant application 108 can identify one or more client devices 104 (e.g., a second client device 104 running on the navigation application 110 associated with the first client device 104 associated through the common login (e.g., account identifier and authentication credentials), location, network, or other linking data. The digital assistant application 108 executing on the first client device 104 can access the navigation application 110 running on the second client device 104 to further process the voice query.

The data processing system 102 and the navigator service 106 each can include at least one server having at least one processor. For example, the data processing system 102 and the navigator service 106 each can include a plurality of servers located in at least one data center or server farm. The data processing system 102 can determine from an audio input signal a request and a trigger keyword associated with the request. Based on the request and trigger keyword, the data processing system 102 can determine whether to forward the audio input signal to the navigator service 106 or to process the audio input signal internally. Responsive to the determination that the audio input signal is to be processed internally, the data processing system 102 can generate or select response data. The response data can be audio-based or text-based. For example, the response data can include one or more audio files that, when rendered, provide an audio output or acoustic wave. The data within the response data can also be referred to as content items. The response data can include other content (e.g., text, video, or image content) in addition to audio content. Responsive to the determination that the audio input signal is to be forwarded, the data processing system 102 can send the audio input signal to the navigator service 106. The navigator service 106 can parse the audio input signal to identify a command to execute. The navigator service 106 can carry out the command and return a result of the command to the data processing system 102 or the client device 104.

The data processing system 102 and the navigator service 106 each can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 and the navigator service 106 each can include servers in a data center that are stored in one or more high-density rack systems, along with associated storage systems, located for example in an enterprise data center. In this way, the data processing system 102 or the navigator service 106 with consolidated servers can improve system manageability, data security, the physical security of the system, and system performance by locating servers and high-performance storage systems on localized high-performance networks. Centralization of all or some of the data processing system 102 or navigator service 106 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repositories 126 and 144 and with other computing devices. The navigator service 106 can also include at least one processing unit, server, virtual server, circuit, engine, agent, appliance, or other logic device such as programmable logic arrays configured to communicate with a data repository and with other computing devices.

The data processing system 102 can include the data repository 126. The data repository 126 can include one or more local or distributed databases and can include a database management system. The data repository 126 can include computer data storage or memory and can store one or more regular expressions 128, one or more parameters 130, one or more policies 132, response data 134, and templates 136, among other data. The parameters 130, policies 132, and templates 136 can include information such as rules about a voice-based session between the client devices 104 and the data processing system 102. The regular expressions 128 can include rules about when the voice-based session between the client devices 104 and the data processing system 102 is to include the navigation application 110 and the navigator service 106. The regular expressions 128, parameters 130, policies 132, and templates 136 can also include information for another digital assistant application 108 received via the interface 112 from another source (e.g., the data processing system 102 and the client devices 104). The response data 134 can include content items for audio output or associated metadata, as well as input audio messages that can be part of one or more communication sessions with the client devices 104.

The data processing system 102 can include at least one computation resource or server. The data processing system 102 can include, interface, or otherwise communicate with at least one interface 112. The data processing system 102 can include, interface, or otherwise communicate with at least one instance of the digital assistant application 108 on the data processing system 102. The instance of the digital assistant application 108 on the data processing system 102 can include, interface, or otherwise communicate with at least one NLP component 114, at least one audio signal generator component 122, and at least one direct action handler component 120. The data processing system 102 can include, interface, or otherwise communicate with at least one response selector component 124. The data processing system 102 can include, interface, or otherwise communicate with at least one data repository 126. The at least one data repository 126 can include or store, in one or more data structures or databases, regular expressions 128, parameters 130, policies 132, response data 134, and templates 136. The data repository 126 can include one or more local or distributed databases, and can include a database management.

The components of the data processing system 102 can each include at least one processing unit or other logic device such as a programmable logic array engine or module configured to communicate with the database repository 128 or 148. The components of the data processing system 102 can be separate components, a single component, or part of multiple data processing systems 102. The system 100 and its components, such as a data processing system 102, can include hardware elements, such as one or more processors, logic devices, or circuits.

The data processing system 102 can include an interface 112. The interface 112 can be configured, constructed, or operational to receive and transmit information using, for example, data packets. The interface 112 can receive and transmit information using one or more protocols, such as a network protocol. The interface 112 can include a hardware interface, software interface, wired interface, or wireless interface. The interface 112 can be a data interface or a network interface that enables the components of the system 100 to communicate with one another. The interface 112 of the data processing system 102 can provide or transmit one or more data packets that include the action data structure, audio signals, or other data via the network 156 to the client devices 104 or the navigator service 106. For example, the data processing system 102 can provide the output signal from the data repository 126 or from the audio signal generator component 122 to the client devices 104. The data processing system 102 can also instruct, via data packet transmissions, the client devices 104 to perform the functions indicated in the action data structure. The output signal can be obtained, generated, transformed to, or transmitted as one or more data packets (or other communications protocol) from the data processing system 102 (or other computing device) to the client devices 104. The interface 112 can facilitate translating or formatting data from one format to another format. For example, the interface 112 can include an application programming interface ("API") that includes definitions for communicating between various components, such as software components.

The data processing system 102 can include an application, script, or program installed at the client device 104, such as the instance of the digital assistant application 108 on the client device 104 to communicate input audio signals to the interface 112 of the data processing system 102 and to drive components of the client computing device to render output audio signals or visual output. The data processing system 102 can receive data packets, a digital file, or other signals that include or identify an input audio signal (or input audio signals). The client device 104 can detect the audio signal via the transducer 150 and convert the analog audio signal to a digital file via an analog-to-digital converter. For example, the audio driver can include an analog-to-digital converter component. The pre-processor component can convert the audio signals to a digital file that can be transmitted via data packets over network 156.

The instance of the digital assistant application 108 of the data processing system 102 can execute or run an NLP component 114 to receive or obtain the data packets including the input audio signal detected by the sensor 154 of the client device 104. The data packets can provide a digital file. The NLP component 114 can receive or obtain the digital file or data packets comprising the audio signal and parse the audio signal. For example, the NLP component 114 can provide for interactions between a human and a computer. The NLP component 114 can be configured with techniques for understanding natural language and enabling the data processing system 102 to derive meaning from human or natural language input. The NLP component 114 can include or be configured with techniques based on machine learning, such as statistical machine learning. The NLP component 114 can utilize decision trees, statistical models, or probabilistic models to parse the input audio signal. The NLP component 114 can perform, for example, functions such as named entity recognition (e.g., given a stream of text, determine which items in the text map to names, such as people or places, and what the type of each such name is, such as person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 114 can convert the input audio signal into recognized text by comparing the input signal against a stored, representative set of audio waveforms (e.g., in the data repository 126) and choosing the closest matches. The set of audio waveforms can be stored in data repository 126 or other database accessible to the data processing system 102. The representative waveforms are generated across a large set of users, and then may be augmented with speech samples from the user. After the audio signal is converted into recognized text, the NLP component 114 matches the text to words that are associated, for example via training across users or through manual specification, with actions that the data processing system 102 can serve. The NLP component 114 can convert image or video input to text or digital files. The NLP component 114 can process, analyze, or interpret image or video input to perform actions, generate requests, or select or identify data structures.

The data processing system 102 can receive image or video input signals, in addition to, or instead of, input audio signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 114) can be configured with the imaging techniques, in addition to, or instead of, audio processing techniques.

The NLP component 114 can obtain the input audio signal. From the input audio signal, the NLP component 114 can identify at least one request, at least one trigger keyword corresponding to the request, and one or more keywords. The request can indicate intent, digital components, or subject matter of the input audio signal. The trigger keyword can indicate a type of action likely to be taken. For example, the NLP component 114 can parse the input audio signal to identify at least one request to find a contact in an end user's contact list. The trigger keyword can include at least one word, phrase, root or partial word, or derivative indicating an action to be taken. For example, the trigger keyword "search" or "find" from the input audio signal can indicate a request to perform a query search. In this example, the input audio signal (or the identified request) does not directly express an intent for the query search, however the trigger keyword indicates that query search is an ancillary action to at least one other action that is indicated by the request.

The NLP component 114 can parse the input audio signal to identify, determine, retrieve, or otherwise obtain the request and the trigger keyword. For instance, the NLP component 114 can apply a semantic processing technique to the input audio signal to identify the trigger keyword or the request. The NLP component 114 can apply the semantic processing technique to the input audio signal to identify a trigger phrase that includes one or more trigger keywords, such as a first trigger keyword and a second trigger keyword. For example, the input audio signal can include the sentence "Look up Alex's phone number." The NLP component 114 can determine that the input audio signal includes trigger keywords "Look up." The NLP component 114 can determine that the request is for looking through the end user's contact list.

The NLP component 114 can determine whether one or more keywords identified from the input audio signal references one or more functions of the navigation application 110. The one or more keywords identified from the input audio signal can include an identifier for the navigation application 110 (e.g., "GPS Navigator A"). The identifier for the navigation application 110 can indicate which application the end user would like to carry out the request. For example, the text converted from the input audio signal can include "Get me directions home using GPS Navigator A." In this input audio signal, the keywords "GPS Navigator A" can be identifier for the navigation application 110 to carry out the request indicated in the audio input signal. The NLP component 114 can determine that the input audio signal includes the identifier for the navigation application 110. Based on determining that the input audio signal including the identifier, the NLP component 114 can determine that the input audio signal references the navigation application 110. Furthermore, the digital assistant application 108 can interface with the navigation application 110 as detailed herein below. Conversely, the NLP component 114 can determine that the input audio signal does not include the identifier for the navigation application 110. Based on determining that the input audio signal does not include the identifier, the NLP component 114 can determine that the input audio signal does not reference the navigation application 110. In addition, the digital assistant application 108 can process the request indicated in the input audio signal.

The NLP component 114 can determine whether one or more keywords identified from the input audio signal references at least one function of the navigation application 110 using the regular expressions 128 for the navigation application 110. The regular expression 128 can define a pattern to match to determine whether the keywords identified from the input audio signal references the at least one function of the navigation application 110. The regular expression 128 can also specify which keywords to use to carry out the command indicated in the input audio signal. For example, the regular expression 128 may be of the form {[request], [referential keywords], [auxiliary keywords]}. For the keywords of the input audio signal to be determined to reference the functions of the navigation application 110, the regular expression 128 can specify that the one or more keywords include a request for the navigation application 110 and one or more referential words used as parameters to carry out the request. The regular expression 128 can specify a sequence for the request and the referential keywords in the one or more keywords identified from the input audio signal.

The regular expression 128 can include a first set of predefined keywords for the request corresponding to a function of the navigation application 110. The first set of predefined keywords can include a function identifier (e.g., "take", "go", "show", "directions" and "find"). Each function identifier in the first set of predefined keywords can be associated with one of the functions of the navigation application 110. The regular expression 128 can include a second set of predefined keywords for the one or more referential words to use as parameters for the navigation application 110 carry out the request corresponding to the function. The second set of predefined keywords can include deictic words (e.g., "here," "there," "over there," and "across"). The second set of predefined keywords can also include keywords associated with points of interest (e.g., "restaurant," "hotel," "café," "gas station," "park," and "airport"). The regular expression 128 can specify that keywords identified in the input audio signal but not match the first set of predefined keywords or the second set of keywords are to be identified as auxiliary keywords. The regular expression 128 can include a third set of predefined keywords for the one or more auxiliary keywords. The third set of predefined keywords can include keywords associated with a display of the client device 104 or the viewport of the navigation application 110 (e.g., "left corner," "right corner," "above," and "middle"). Each keyword of the third set can correspond to a subset area of the display of the client device 104. The regular expression 128 can specify a sequence for the request and the referential keywords in the one or more keywords identified from the input audio signal. The regular expression 128 can specify that responsive to determining that the input audio signal includes one or more keywords matching one of the first predefined set, at least one of the remaining keywords are to be used as the one or more parameters to carry out the request.

In determining whether the one or more keywords reference at least one function of the navigation application 110, the NLP component 114 can compare the one or more keywords against the regular expression 128. The NLP component 114 can also compare one or more permutations of keywords (e.g., n-grams) identified from the input audio signal against the regular expression 128. The NLP component 114 can compare the one or more keywords against the first set of predefined keywords specified by the regular expression 128. The NLP component 114 can determine that there is no match between all the keywords with all of the first set of predefined keywords. Responsive to determining no match between all the keywords of the input audio signal and any of the first set, the NLP component 114 can determine that the input audio signal does not reference any function of the navigation application 110. The NLP component 114 can determine that the input audio signal instead references one of the functions of the digital assistant application 108. The digital assistant application 108 can perform further processing with the keywords to carry out the request.

On the other hand, in response to the determination of the match, the NLP component 114 can determine that the input audio signal references at least one function of the navigation application 110. The NLP component 114 can identify the function identifier from the first set of predefined keywords matching the at least one keyword corresponding to the request. The NLP component 114 can determine a request type corresponding to one of the functions of the navigation guidance process of the navigation application 110. The navigation guidance processes of the navigation application 110 can include a location finding operation and a path routing operation. The request type can include the location finding operation and the path routing operation. The function identifier can be associated with one of the request types. Based on the association of the function identifier, the NLP component 114 can determine the request type indicated by the request parsed from the input audio signal.

The NLP component 114 can also identify one or more referential keywords and auxiliary keywords from the keywords of the input audio signal to use as the one or more parameters to carry out the request. The NLP component 114 can compare the one or more remaining keywords with the second set of predefined keywords. The NLP component 114 can determine a match between at least one keyword with at least one of the second set of predefined keywords. In response to the determination of the match, the NLP component 114 can identify the at least one keyword as at least one of the referential keywords to use to carry out the request. The NLP component 114 can also perform semantic analysis to identify one or more keywords to use as the referential keywords and auxiliary keywords for the navigation application 110 to carry out the request. The semantic analysis can include deixis and anaphora analysis to identify the referential keywords. The NLP component 114 can identify one or more remaining keywords identified from the input audio signal besides the request and the referential keywords as auxiliary keywords. The NLP component 114 can compare the one or more remaining keywords with the third set of predefined keywords. The NLP component 114 can determine a match between at least one keyword with at least one of the third set of predefined keywords. In response to the determination of the match, the NLP component 114 can identify the at least one keyword as at least one of the auxiliary keywords. Based on the identification of the request and the referential keywords from the input audio signal, the NLP component 114 can determine that the input audio signal references the function of the navigation application 110. For example, for the input audio signal "Take me to store ABC shown in the corner", the NLP component 114 can determine that the input audio signal references the functionalities of the navigation application 110 based on the inclusion both "take me" and "store ABC." In this example, using the regular expression 128 and semantic analysis techniques, the NLP component 114 can determine "take me" as the request, "store ABC" as a referential keyword to carry out the request, and "shown in corner of screen" as auxiliary keywords.

The data processing system 102 can execute or run an instance of the navigation interface component 116. In response to determining that the input audio signal references at least one function of the navigation application 110, the navigation interface component 116 can access the navigation application 110 executing on the client device 104 or the navigator service 106. The navigation interface component 116 can access the navigation application 110 in accordance with an application programming interface (API) that includes definitions for communicating between the digital assistant application 108 and the navigation application 110. The navigation interface component 116 can invoke a function call defined by the API to access the navigation application 110. The navigation interface component 116 can identify the navigation application 110 associated with the digital assistant application 108 through the common login (e.g., account identifier and authentication credentials), location, network, or other linking data. For example, the end user may have used the same account and login details for the digital assistant application 108 and the navigation application 110. By accessing, the navigation interface component 116 can retrieve data from the navigation application 110. The data can be related or correspond to contents of the portion of the vector-based map 146 visible through the viewport of the navigation application 110.

Prior to accessing, the navigation interface component 116 can also determine whether the data was previously received from the navigation application 110. The digital assistant application 108 may already have accessed the navigation application 110 in response to the previously received input audio signals. The previously received data can be maintained on the client device 104 (e.g., on the memory). The navigation interface component 116 can identify the previously received data and a receipt time of the previously received data. The navigation interface component 116 can also identify the current time corresponding to the time of receipt of the current input audio signal. The navigation interface component 116 can compare a time elapsed between the receipt time and the current time to a defined threshold time. Responsive to determining that the elapsed time is greater than the defined threshold time, the navigation interface component 116 can proceed to access the navigation application 110. Otherwise, responsive to determining that the elapsed time is less than the defined threshold time, the navigation interface component 116 can retrieve and use the previously received data from the navigation application 110.

In accessing the navigation application 110, the navigation interface component 116 can determine whether the client device 104 that received the input audio signal referencing the at least one function of the navigation application 110 is running or has an instance of the navigation application 110. The navigation application 110 accessed by the navigation interface component 116 can be running or present on a client device 104 different from the client device 104 that received the input audio signal. Responsive to determining that the client device 104 is running or has the navigation application 110, the navigation interface component 116 can access the navigation application 110 on the same client device 104. On the other hand, responsive to determining that the client device 104 is not running or lacks the navigation application 110, the navigation interface component 116 can identify another client device 104 running the navigation application 110. The navigation interface component 116 can identify another client device 104 associated with the client device 104 that received the input audio signal through the common login (e.g., account identifier and authentication credentials), location, network, or other linking data. The navigation interface component 116 can determine that the other client device 104 is running or has an instance of the navigation application 110. The navigation interface component 116 can access the navigation application 110 running or present on the other client device 104 associated with the client device 104 that received the input audio signal. The navigation interface component 116 can send or transmit an access request to the navigation application 110 running on the client device 104 or the navigator service 106. The access request can include the linking data for the digital assistant application 108 and the navigation application 110.

The data processing system 102 or the navigator service 106 can execute or run an instance of the digital assistant interface component 138 of the navigation application 110. The digital assistant interface component 138 can identify the navigation interface component 116 accessing the navigation application 110. In response to the identification of the access, the digital assistant interface component 138 can identify a set of point locations within the reference frame corresponding to the portion of the vector-based map 146 displayed in the viewport of the navigation application 110. As discussed above, each point location can correspond to one of the artificial features and natural features, can be associated with a geographic coordinate, and can have at least one identifier. To identify the set of point locations, the digital assistant interface component 138 can identify the portion of the vector-based map 146 visible or displayed in the viewport of the navigation application 110. The portion of the vector-based map 146 may be smaller than an entirety of the vector-based map 146, and can correspond to a geographic region displayed in the viewport of the navigation application 110. The digital assistant interface component 138 can identify dimensions and coordinates of the portion of the vector-based map 146 visible through the viewport of the navigation application 110. The coordinates can define the portion of the vector-based map 146 visible through the viewport of the navigation application 110, such as top-left coordinates and bottom-right coordinates. The coordinates can correspond to the geographic coordinates on a geographic map. The portion of the vector-based map 146 can correspond to the reference frame for the instance of the navigation application 110 running on the client device 104.

The digital assistant interface component 138 can set or identify the portion of vector-based map 146 visible through the viewport as the reference frame for the navigation application 110 running on the client device 104. The reference frame can correspond to dimensions, coordinates, and other measures of the vector-based map 146 displayed in the viewport of the navigation application 110, and can be particular to the end user of the client device 104. Using the dimension and coordinates of the portion of the vector-based map 146 visible through the viewport, the digital assistant interface component 138 can identify dimensions and coordinates defining the portion of the reference frame. The coordinates can correspond to the coordinates on the reference frame such as top-left coordinates and bottom-right coordinates. The digital assistant interface component 138 can compare the geographic coordinates of each point location with the dimensions and coordinates identified for the portion of the vector-based map 146 displayed in the viewport. Based on the comparison, the digital assistant interface component 138 can select or identify the set of point locations within the reference frame corresponding to the portion of the vector-based map 146 visible through the viewport. The digital assistant interface component 138 can provide the set of point locations to the navigation interface component 116 of the digital assistant application 108.

The digital assistant interface component 138 can provide display information regarding the viewport of the navigation application 110 to the navigation interface component 116 of the digital assistant application 108. The digital assistant interface component 138 can provide the dimensions and coordinates of the portion of the vector-based map 146 visible through the view port to the navigation interface component 116 of the digital assistant application 108. The digital assistant interface component 138 can identify the dimensions of the viewport of the navigation application 110 itself. The dimensions of the viewport can be defined using a number of pixels in width versus height. The digital assistant interface component 138 can provide the dimensions of the viewport of the navigation application 110 to the navigation interface component 116 of the digital assistant application 108.

In conjunction with identifying the set of point locations, the digital assistant interface component 138 can identify a current location of the client device 104 within the portion of the vector-based map 146 visible through the viewport of the navigation application 110. The digital assistant interface component 138 can access a geographic positioning system (GPS) interface. The GPS interface can in turn communicate with a GPS satellite to identify or receive current geographic coordinates of the client device 104 running the navigation application 110. The GPS interface can convert the geographic coordinates of the client device 104 received from the GPS satellite to a location identifier on the vector-based map 146. The location identifier can be an index assigned to the geographic coordinate of the physical world to the vector-based map 146. The conversion of the geographic coordinates to the location identifiers can be in accordance to set mapping or function. Once converted, the digital assistant interface component 138 can provide the location identifier of the client device 104 to the navigation interface component 116 of the digital assistant application 108. The digital assistant interface component 138 can also provide the location identifier for each identified point location to the navigation interface component 116.

The digital assistant interface component 138 can also identify another set of point locations outside the portion of the vector-based map 146 visible or displayed in the viewport of the navigation application 110. The navigation application 110 can be performing the path routing operation of the navigation guidance process to determine a path from a start location to a destination location on the vector-based map 146, when the input audio signal is received. The destination location and the designated location can correspond to a location on the vector-based map 146 outside the portion of the vector-based map 146 outside the viewport of the navigation application 110. The digital assistant interface component 138 can identify the destination location from the path routing operation. The digital assistant interface component 138 can determine a portion of the vector-based map 146 within a defined proximity (e.g., 1 km to 5 km) about the destination location. The portion of the vector-based map 146 within the defined proximity can be defined using dimensions and coordinates to include the destination location. The portion of the vector-based map 146 within the defined proximity can have a size equal to the portion of the vector-based map 146 currently displayed in the viewport of the navigation application 110. The digital assistant interface component 138 can set or identify the portion of the vector-based map 146 within the defined proximity about the destination location as the part of the reference frame.

Using the dimension and coordinates of the portion of the vector-based map 146 within the defined proximity about the destination location, the digital assistant interface component 138 can identify dimensions and coordinates defining the portion of the reference frame. The coordinates can correspond to the coordinates on the reference frame such as the top-left and bottom-right coordinates on the vector-based map 146. The digital assistant interface component 138 can compare the geographic coordinates of each point location with the dimensions and coordinates identified for the portion of the vector-based map 146. Based on the comparison, the digital assistant interface component 138 can select or identify the set of point locations within the reference frame corresponding to the portion of the vector-based map 146 within the defined proximity about the destination location. The digital assistant interface component 138 can provide the set of point locations to the navigation interface component 116 of the digital assistant application 108. In providing the set of point locations, the digital assistant interface component 138 can label the point locations as corresponding to portions of the vector-based map 146 visible through the viewport or not visible through the viewport of the navigation application 110.

In response to identification of the navigation interface component 116 accessing the navigation application 110, the digital assistant interface component 138 can identify a set of search terms received by the navigation application 110. The search terms can include one or more keywords previously received by the navigation application 110 in performing the navigation guidance process, such as the functionalities performed by the location finder component 140 or the path router component 142. For example, the end user of the navigation application 110 may have previously typed "stationery stores" to look for stationary stores in the vicinity. In another example, the navigation 110 may have previously received the query "Tower ABC" converted from an input audio signal by the NLP component 114 to find the named tower. Previously received search terms can be stored and maintained on the navigation application 110. Each search term can also be associated or indexed by a receipt timestamp indicating when the search term was received by the navigation application 110. The digital assistant interface component 138 can select or identify the set of search terms previously received by the navigation application 110 within a defined time window prior to the receipt of the input audio signal by the digital assistant application 108. The defined time window can range from 15 minutes to 2 hours. The digital assistant interface component 138 can identify a time of receipt of the input audio signal or a time of the navigation interface component 116 accessing the navigation application 110. The digital assistant interface component 138 can compare the receipt timestamps of the search terms with the time of receipt of the input audio signal or access and the defined time window. The digital assistant interface component 138 can identify or select the set of search terms with receipt timestamps within the defined time window of the time of receipt of the input audio signal or access.

The data processing system 102 can execute or run an instance of the geolocation sensing component 118 of the digital assistant application 108 or the navigation application 110. The navigator service 106 can execute or run an instance of the geolocation sensing component 118 of the navigation application 110. In response to determining that the input audio signal references at least one function of the navigation application 110, the geolocation sensing component 118 can retrieve data acquired from at least one sensor 154 of the client device 104 running the digital assistant application 108. The sensors 154 accessed by the geolocation sensing component 118 can include the inertial motion unit, the accelerometer, the gyroscope, the motion detector, the GPS sensor, and the location sensor, among others. Using the retrieved data, the geolocation sensing component 118 can determine or identify a direction of travel, a position, and a speed, among other measures of the client device 104 running the digital assistant application 108. The geolocation sensing component 118 can further determine a change in the direction of travel, the position, and the speed, among measures of the client device 104 running the digital assistant application 108 using multiple measurements. The change can be relative to one or more previous measurements sampled at a defined interval. The geolocation sensing component 118 can determine or identify a direction of travel, a position, and a speed, among other measures of the client device 104 running the navigation application 110. The geolocation sensing component 118 can further determine a change in the direction of travel, the position, and the speed, among measures of the client device 104 running the navigation application 110 using multiple measurements. The change can be relative to one or more previous measurements sampled at a defined interval.

Using the measurements identified by the geolocation sensing component 118, the digital assistant interface component 138 can identify another set of point locations of the portion of the vector-based map 146 previously displayed in the viewport of the navigation application 110. The digital assistant interface component 138 can identify a previously displayed portion of the vector-based map 146 based on the one or more measurements direction of travel, the speed, and the position from the geolocation sensing component 118. The digital assistant interface component 138 can also identify the currently displayed portion of the vector-based map 146. Using the change in the direction of travel, the position, and the speed and the currently displayed portion of the vector-based map 146, the digital assistant interface component 138 can determine the previously displayed portion of the vector-based map 146. The change in the direction of travel, the position, and the speed can be relative to a time at a defined length (e.g., 15 seconds to 3 minutes) prior to the present. From the currently displayed portion of the vector-based map 146, the digital assistant interface component 138 can shift to another portion of the vector-based map 146 based on the change from previously measured position. Once shifted, the digital assistant interface component 138 can identify the previously displayed portion of the vector-based map 146.

The digital assistant interface component 138 can set or identify the previously displayed portion of the vector-based map 146 as part of the reference frame as the currently displayed portion of the vector-based map 146. Once set, one portion of the reference frame can correspond to the currently displayed portion of the vector-based map 146 and another portion of the reference frame can correspond to the previously displayed portion of the vector-based map 146. The digital assistant interface component 138 can identify dimensions and coordinates of the previously displayed portion of the vector-based map 146. The coordinates can correspond to the coordinates on the reference frame such as the top-left and bottom-right coordinates on the vector-based map 146. The digital assistant interface component 138 can compare the geographic coordinates of each point location with the dimensions and coordinates identified for the previously displayed portion of the vector-based map 146. Based on the comparison, the digital assistant interface component 138 can select or identify the set of point locations within the reference frame corresponding to the previously displayed portion of the vector-based map 146. The digital assistant interface component 138 can provide the set of point locations to the navigation interface component 116 of the digital assistant application 108.

In addition, the digital assistant interface component 138 can identify a to-be displayed portion of the vector-based map 146 based on the one or more measurements direction of travel, the speed, and the position from the geolocation sensing component 118. The digital assistant interface component 138 can also identify the currently displayed portion of the vector-based map 146. Using the change in the direction of travel, the position, and the speed and the currently displayed portion of the vector-based map 146, the digital assistant interface component 138 can determine the to-be displayed portion of the vector-based map 146. The change in the direction of travel, the position, and the speed can be relative to a time at a defined length (e.g., 15 seconds to 3 minutes) prior to the present. Using the change in the direction of travel, the position, and the speed, the digital assistant interface component 138 can determine a predicted direction of travel, position, and speed. From the currently displayed portion of the vector-based map 146, the digital assistant interface component 138 can shift to another portion of the vector-based map 146 based on the predicted direction of travel, position, and speed. Once shifted, the digital assistant interface component 138 can identify the to-be displayed portion of the vector-based map 146.

The digital assistant interface component 138 can set or identify the to-be displayed portion of the vector-based map 146 as part of the reference frame as the currently displayed portion of the vector-based map 146. Once set, one portion of the reference frame can correspond to the currently displayed portion of the vector-based map 146 and another portion of the reference frame can correspond to the to-be displayed portion of the vector-based map 146. The digital assistant interface component 138 can identify dimensions and coordinates of the to-be displayed portion of the vector-based map 146. The coordinates can correspond to the coordinates on the reference frame such as the top-left and bottom-right coordinates on the vector-based map 146. The digital assistant interface component 138 can compare the geographic coordinates of each point location with the dimensions and coordinates identified for the to-be displayed portion of the vector-based map 146. Based on the comparison, the digital assistant interface component 138 can select or identify the set of point locations within the reference frame corresponding to the to-be displayed portion of the vector-based map 146. The digital assistant interface component 138 can provide the set of point locations to the navigation interface component 116 of the digital assistant application 108.

With the retrieval of the data from the navigation application 110, the NLP component 114 can disambiguate or identify one or more point location from the set of point locations within the reference frame based on the one or more referential keywords and the identifiers for the set of point locations. The NLP component 114 can determine a correlation between the one or more keywords and the identifiers for the set of point locations to identify the point locations using a semantic knowledge graph (sometimes referred to as a semantic graph or semantic network). The semantic knowledge graph can include a set of nodes connected to one another via vertices. Each node can correspond to a keyword or phrase. Each vertex can specify a semantic distance between two nodes. The semantic distance can represent or correspond to a semantic similarity or relatedness measure between the words or phrases of the nodes. For each point location of the set, the NLP component 114 can calculate or determine a semantic distance between the corresponding identifier for the point location and the one or more referential keywords using the semantic knowledge graph. As previously discussed, the identifier can include a name or a category type. In the semantic knowledge graph, the NLP component 114 can identify the node corresponding to the referential keyword and the node corresponding to the identifier for the point location. The NLP component 114 can then determine the semantic distance between the two nodes. The NLP component 114 can identify the one or more point locations based on the semantic distances between the referential words and the identifiers of the set of point locations. Having determined the semantic distances using the semantic knowledge graph, the NLP component 114 can identify the point location with the lowest semantic distance with the one or more referential keywords. To identify multiple point locations, the NLP component 114 can identify the one or more point locations with the lowest n semantic distances from the referential keywords.

Using the semantic knowledge graph, the NLP component 114 can also determine whether the referential keywords refer to any of the point locations within the reference frame.

The NLP component 114 can compare the semantic distance between each referential keyword and the identifier for each point location to a threshold distance. The threshold distance can indicate the maximum semantic distance at which the NLP component 114 can determine that referential keyword refers to the identifier in the semantic knowledge graph. The NLP component 114 can determine at least one semantic distance between one of the referential keywords and one of the identifiers is less than or equal to the threshold distance. Responsive to the determination that at least one semantic distance is less than or equal to the threshold distance, the NLP component 114 can determine at least one referential keyword refers to one of the point locations within the reference frame. Conversely, the NLP component 114 can determine that all the semantic distances are greater than the threshold distance. Responsive to the determination that all the semantic distances are greater than the threshold distance, the NLP component 114 can determine that the referential keywords do not refer to any point locations within the reference frame.

The NLP component 114 can also identify the one or more point locations using semantic analysis techniques, such as word-sense disambiguation, discourse referent analysis, and deictic analysis, among others. The NLP component 114 can determine whether to use the semantic analysis techniques based on the semantic distances determined using the semantic knowledge graph. The NLP component 114 can compare the semantic distances between the referential keywords and the identifiers of the point location to a threshold distance. The NLP component 114 can determine that a set percentage of the semantic distances (e.g., above 90%) are greater than the threshold. The relatively high semantic distances may indicate that semantic knowledge graph may be ineffective at disambiguating among the identifiers for the point locations. In response to the determination, the NLP component 114 can use the semantic analysis techniques to identify the one or more point locations. For each point location of the set the NLP component 114 can apply the semantic analysis technique to calculate or determine an indexical measure between the corresponding identifier for the point location and the referential keywords. The indexical measure can indicate a likelihood that the referential keyword parsed from the input audio signal references or denotes the identifier for the point location. Having determined the indexical measures, the NLP component 114 can identify the point location with the greatest indexical measure with the one or more referential keywords. To identify multiple point locations, the NLP component 114 can identify the one or more point locations with the greatest n indexical measures in relation to the referential keywords.

Using the indexical analysis techniques, the NLP component 114 can also determine whether the referential keywords refer to any of the point locations within the reference frame. The NLP component 114 can compare the indexical measures between each referential keyword and the identifier for each point location to a threshold measure. The threshold measure can indicate the maximum indexical measure at which the NLP component 114 can determine that referential keyword refers to the identifier. The NLP component 114 can determine at least one indexical measure between one of the referential keywords and one of the identifiers is less than or equal to the threshold measure. Responsive to the determination that at least one indexical measure is less than or equal to the threshold measure, the NLP component 114 can determine at least one referential keyword refers to one of the point locations within the reference frame. Conversely, the NLP component 114 can determine that all the indexical measures are greater than the threshold measure. Responsive to the determination that all the indexical measures are greater than the threshold measure, the NLP component 114 can determine that the referential keywords do not refer to any point locations within the reference frame.

The NLP component 114 can use the set of search terms previously received by the navigation application 110 to identify the one or more point locations from the set of point locations. For each point location of the set, the NLP component 114 can calculate or determine a semantic distance between the corresponding identifier for the point location and the one or more search terms. In the semantic knowledge graph, the NLP component 114 can identify the node corresponding to the search term and the node corresponding to the identifier for the point location. The NLP component 114 can then determine the semantic distance between the two nodes. The NLP component 114 can select a subset of point locations based on the semantic distances between the search terms and the identifiers of the set of point locations. From the set of point locations retrieved from the navigation application 110, the NLP component 114 can select the subset of point locations with the lowest n semantic distances from the referential keywords. From the subset of point locations, the NLP component 114 can identify the one or more point locations using the functionalities detailed herein above.

Using the measurements from the geolocation sensing component 118, the NLP component 114 can identify the one or more point locations from the set. As discussed above, the geolocation sensing component 118 can determine or identify a direction of travel, a position, and a speed, among other measures of the client device 104 running the digital assistant application 108 or the navigation application 110. The NLP component 114 can identify or select a subset of point locations from the set based on the measurements from the geolocation sensing component 118. The NLP component 114 can identify the geographic coordinates of each point location retrieved from the navigation application 110. The NLP component 114 can compare the geographic coordinates of the set of point locations with the position of the client device 104. The NLP component 114 can identify the subset of location points with geographic coordinates within a defined proximity (e.g., within 1 to 3 km) of the position of the client device 104. From the subset, the NLP component 114 can use the direction of travel to select a smaller subset of point locations. The NLP component 114 can select or identify the smaller subset of point locations with geographic coordinates along the direction of travel and exclude the point locations opposite of the direction of travel. For example, the NLP component 114 can select the point locations north within 2 km of the client device 104, when the client device 104 is measured travelling northward. From the smaller subset of point locations, the NLP component 114 can identify the one or more point locations using the functionalities detailed herein above.

The NLP component 114 can use the location identifier of the client device 104 and the location identifiers of the point locations to identify the one or more point locations from the set. The NLP component 114 can compare the location identifier for the client device 104 to the location identifiers of the point locations in the set. For each point location, the NLP component 114 can determine whether the location identifier of the point location is within a defined proximity (e.g., less than 1 km to 3 km) of the location identifier for the client device 104. The NLP component 114 can select the subset of point locations with location identifiers within the defined proximity of the location identifier of the client device 104. From the subset of point locations, the NLP component 114 can identify the one or more point locations using the functionalities detailed herein above.

In identifying the one or more point locations, the NLP component 114 can search for other keywords related to the referential keywords identified in the input audio signal. The NLP component 114 can automatically generate the expanded entity based on content or preferences the data processing system 102 received from the client device 104. The NLP component 114 can generate the expanded entity based on content or preferences the data processing system 102 requests from the client device 104 in a subsequent audio-based input request. Based on the content or preferences received by the data processing system 102, the NLP component 114 can search for additional keywords related to the referential keywords to identify the one or more point locations. For example, the input audio signal can include "Ok, let's go home," and the NLP component 114 may have identified "home" as a referential keyword. The end user of the client device 104 may have previously provided the data processing system 102 running the digital assistant application 108 with the end user's home address. In this example, the NLP component 114 can retrieve the location identifier for the end user's home address, and compare with the location identifiers of the point locations retrieved from the navigation application 110. By comparing the location identifiers, the NLP component 114 can identify the point location corresponding to the referential keyword of "home."

The NLP component 114 can identify the one or more point locations from the set based on further analysis of the referential keywords. The NLP component 114 can determine or identify which portion of the vector-based map 146 the referential keyword is referencing. As discussed above, the navigation interface component 116 can access the navigation application 110 to retrieve the point locations of a portion of the vector-based map 146 visible through the viewport. The navigation interface component 116 can access the navigation application 110 to access another portion of the vector-based map 145 about the proximity outside the viewport about the destination location. The point locations can be labeled as visible within the viewport or outside the viewport. The NLP component 114 can perform semantic analysis techniques to determine whether the referential keyword is a proximal word or a distal word. The proximal word can denote a point location nearby, and can correlate to one of the point locations in the portion of the vector-based map 146 visible through the viewport of the navigation application 110. The distal word can denote a point location afar, and can correlate to one of the point locations in the portion of the vector-based map 146 outside the viewport of the navigation application 110. The NLP component 114 can compare the one or more referential keywords to a set of predefined proximal words (e.g., "here," "nearby," and "close by") and to a set of predefined distal words (e.g., "by the destination," "over there," "along,"). The NLP component 114 can determine that the referential word is a proximal word. In response to the determination, the NLP component 114 can select or identify a subset of point locations corresponding to the point locations on the portion of the vector-based map 146 visible through the viewport. The NLP component 114 can determine that the referential word is a distal word. In response to the determination, the NLP component 114 can select or identify a subset of point locations corresponding to the point locations on the portion of the vector-based map 146 outside the viewport. From the subset of point locations, the NLP component 114 can identify the one or more point locations using the functionalities detailed herein above.

The NLP component 114 can identify the one or more point locations from the set of point locations within the reference frame using the one or more auxiliary keywords parsed from the input audio signal. As discussed above, the auxiliary keywords may be the keywords parsed from the input audio signal besides the request and the one or more referential keywords, and can correspond to keywords referencing the display of the client device 104. In identify the keyword parsed from the input audio signal as an auxiliary keyword, the NLP component 114 can identify a subset area of the viewport of the navigation application 110 or the display of the client device 104 running the navigation application 110 for the auxiliary keyword. As described previously, each keyword in the third set of predefined keywords used to identify the auxiliary keyword can correspond or be associated with the subset area of the viewport of the navigation application 110. For example, the auxiliary keyword "top-left corner" can correspond to a top left quadrant of the viewport of the navigation application 110. The subset area of the viewport of the navigation application 110 can be defined using pixel coordinates (e.g., length by width). The NLP component 114 can identify or determine a subset area of the portion of the vector-based map 146 visible through the viewport corresponding to the subset area associated with the auxiliary keywords. The NLP component 114 can convert the pixel coordinate defined for the subset area of the viewport associated with the auxiliary keywords to the dimensions and coordinates for the portion of the vector-based map 146 visible through the viewport.

Using the dimensions and the coordinates for the subset area of the portion of the vector-based map 146 corresponding to the subset area of the viewport associated with the auxiliary keywords, the NLP component 114 can select or identify a subset of point locations. The NLP component 114 can compare the geographic coordinates of each point location with the dimensions and coordinates. Based on the comparison, the NLP component 114 can select or identify the point locations inside the subset area of the portion of the vector-based map 146. From the subset of point locations, the NLP component 114 can identify the one or more point locations using the functionalities detailed herein above.

The NLP component 114 can use previously received input audio signals in identifying the one or more point locations from the set. The NLP component 114 can store and maintain input audio signals determined to reference at least one function of the navigation application 110. The NLP component 114 can also store and maintain the one or more keywords parsed from the previously received input audio signals determined to reference at least one function of the navigation application 110. The NLP component 114 can identify a time elapsed since receipt of each stored input audio signal. For each input audio signal, the NLP component 114 can determine whether the elapsed time is greater than or equal to a defined threshold time (e.g., 15 seconds to 60 minutes). The NLP component 114 can identify a set of previously received input audio signals with elapsed time less than the defined threshold time. For each in the set, the NLP component 114 can parse the input audio signal to identify the one or more referential keywords using functionalities described herein above.

Using the referential keywords from the previous input audio signal, the NLP component 114 can select or identify a subset of point locations from the set of point locations.

The NLP component 114 can determine a match between the referential keywords from the previous input audio signal and the referential keywords from the current input audio signal. Based on the match, the NLP component 114 can adjust (e.g., by decreasing) the semantic distance between the referential keyword corresponding to the match and the identifier of the point location. For example, both the previous and the current input audio signal can include the referential word "restaurant." Having determined the match, the NLP component 114 can decrease the semantic distance between the referential word "restaurant" and the identifier, thereby increasing the likelihood that the point locations corresponding to restaurants is selected.

The NLP component 114 can also use the semantic analysis techniques to calculate or determine an indexical measure between the referential words of the current input audio signal with the referential words of the previously received input audio signals. The semantic analysis techniques can include word-sense disambiguation, discourse referent analysis, and deictic analysis, among others. For each of the referent words of the previously received input audio signals, the NLP component 114 can calculate or determine the indexical measure. As discussed previously, the indexical measure can indicate a likelihood that the referential keyword parsed from the input audio signal references or denotes the identifier for the point location. Having determined the indexical measures, the NLP component 114 can identify the referential word from the previously received input audio signal with the greatest indexical measure with the one or more referential keywords. To identify multiple point locations, the NLP component 114 can identify the one or more referential words from the previously received input audio signal with the greatest n indexical measures in relation to the referential keywords of the current input audio signal. With the identification, the NLP component 114 can use the one or more referential keywords from the previously received input audio signals to select the subset of point locations.

For each point location of the set, the NLP component 114 can calculate or determine a semantic distance between the corresponding identifier for the point location and the one or more referential keywords from the previously received input audio signal. In the semantic knowledge graph, the NLP component 114 can identify the node corresponding to the referential keywords and the node corresponding to the identifier for the point location. The NLP component 114 can then determine the semantic distance between the two nodes. The NLP component 114 can select a subset of point locations based on the semantic distances between the referential keywords and the identifiers of the set of point locations. From the set of point locations retrieved from the navigation application 110, the NLP component 114 can select the subset of point locations with the lowest n semantic distances from the referential keywords. From the subset of point locations, the NLP component 114 can identify the one or more point locations using the functionalities detailed herein above.

The data processing system 102 can execute or run an instance of the direct action handler component 120. The direct action handler component 120 can execute scripts or programs based on input received from the NLP component 114. The navigator service 106 can provide the scripts or programs. The navigator service 106 can make the scripts or programs available to the data processing system 102 through the API. The direct action handler component 120 can determine parameters or responses to input fields and can package the data into an action data structure. The action data structure can be provided to the data processing system 102 through the API. The direct action handler component 120 can transmit the action data structure to the navigation application 110 for fulfillment or the data processing system 102 can fulfill the instructions of the action data structure.

The direct action handler component 120 can generate or select data structure for the actions of a thread or conversations based on the request and the referential keywords parsed from the input audio signal. As described above the NLP component 114 can determine that the input audio signal references the navigation application 110 and which function of the navigation application 110. The action data structure can include information for the navigation application 110 to complete the request. The information can include the request type corresponding to one of the functions of the navigation application 110 indicated in the input audio signal. The information can include one or more parameters to carry out the function of the navigation application 110 corresponding to the function type. The one or more parameters can include the one or more point locations identified using the referential keywords and auxiliary keywords parsed from the input audio signal. The one or more parameters can include the identifiers for the one or more identified point locations. The one or more parameters can include linking data for the digital assistant application 108 or the navigation application 110 running on the client device 104, such as an account identifier and authentication credentials. The direct action handler component 120 can also invoke or call the navigation application 110 using the request. The direct action handler component 120 can package the request into an action data structure for transmission as another request (also sometimes referred to as a message) to the navigator service 106.

The direct action handler component 120 can retrieve at least one template 136 from the data repository 126 to determine which fields to include into the action data structure for the navigation application 110. The direct action handler component 120 can retrieve the template 136 to obtain information for the fields of the data structure. Using the request type and the one or more parameters, the direct action handler component 120 can populate the fields from the template 136 to generate the action data structure. The template 136 can be set or configured for the navigation application 110 or the navigation service 106 for creation of the action data structure. For example, the template 136 for the navigation application 110 can be of the following form: {[account identifier], [authentication credentials], [request type], [parameters]}. In populating the template 136 for the navigation application 110, the direct action handler component 120 can identify and insert the account identifier, the authentication credentials, the request type (or function identifier), and the one or more parameters, among other information.

Responsive to determining that at least one referential keyword references one of the point locations within the reference frame, the direct action handler component 120 can set the one or more parameters to include the identifiers of the point locations, coordinates of the client device 104, and location identifiers of the point locations, among other data. The identifiers included in the parameters may include the identifiers for the point locations identified using the referential keyword. The one or more parameters can also include an indicator that at least one referential keyword references one of the point locations within the reference frame. Responsive to determining that the referential keywords do not reference any of the point locations within the reference frame, the direct action handler component 120 can set the one or more parameters to include the coordinates of the client device 104 and the referential keywords, among others. The one or more parameters can also include an indicator that the referential keywords do not reference any of the point locations within the reference frame.

The direct action handler component 120 can expand the entities to convert the entities into a format that the navigator service 106 for a given field of the action data structures for the navigator service 106. The entities can include information that may be ambiguous or unclear to the navigator service 106. For example, when the navigator service 106 requested a street address, the end user may provide an entity that is the proper name of a location or business. The NLP component 114 can automatically generate the expanded entity based on content or preferences the data processing system 102 received from the client device 104. The NLP component 114 can generate the expanded entity based on content or preferences the data processing system 102 requests from the client device 104 in a subsequent audio-based input request. For example, the data processing system 102 can receive an input audio signal that includes "Ok, let's go home." The NLP component 114 may have determined which identifier of the point locations retrieved from the navigation application 110 corresponds to the referential keyword. For example, the NLP component 114 can identify "home" as a location entity as one of the one or more parameters for the function; however, the location field in the action data structure can require a street address, city, state, and zip code. In this example, the "home" location entity is not in the format requested by the navigator service 106. When the end user of the client device 104 previously provided the data processing system 102 or the navigator service 106 with the end user's home address, the NLP component 114 can expand "home" into the format requested by field of the service provider device's action data structure (e.g., {street_address:"123 Main St.", city:"Anytown", state:"CA"}). If the end user did not previously provide the data processing system 102 with the end user's home address, the data processing system 102 can generate and transmit an audio-based input request that requests the end user indicate a specific address rather than "home." Expanding the entity prior to transmitting the entity to the navigator service 106 can reduce the number of required network transmission because the navigator service 106 may not send another request clarifying or additional information after receiving the unexpanded entity.

Upon generation of the action data structure, the direct action handler component 120 can send, transmit, or provide the action data structure to the navigation application 110. As previously described, the client device 104 running the digital assistant application 108 can lack the navigation application 110, and in response the navigation interface component 116 can access another associated client device 104 to access the navigation application 110. Responsive to determining that the client device 104 that received the input audio signal is running or has the navigation application 110, the direct action handler component 120 can provide the action data structure to the navigation application 110. Conversely, responsive to determining that the client device 104 that received the input audio signal is not running or lacks the navigation application 110, the direct action handler component 120 can provide the action data structure to another client device 104 identified as running or having the navigation application 110.

The digital assistant interface component 138 can receive the action data structure generated by the direct action handler component 120. The digital assistant interface component 138 can parse the action data structure in accordance to the template 136. The digital assistant interface component 138 can also maintain a copy of the template 136 (e.g., on a database accessible by the navigator service 106). By applying the template 136, the digital assistant interface component 138 can identify the account identifier, the authentication credentials, the request type, and the one or more parameters from the data action structure. The digital assistant interface component 138 can authenticate the account identifier by comparing a local copy of authentication credentials to the copy of the authentication credentials from the action data structure. The digital assistant interface component 138 can retrieve the local copy of the authentication credentials from the navigator service 106 or the navigation application 110 running on the client device 104 using the account identifier. Responsive to determining a match between the authentication credentials to successfully authenticate the account identifier, the digital assistant interface component 138 can initiate the navigation guidance process using the request type and the one or more parameters. The navigation guidance process can include the location finding operation and the path routing operation. The digital assistant interface component 138 can identify the request type as corresponding to the location finding operation. Responsive to the identification, the digital assistant interface component 138 can invoke the location finder component 140 to initiate the location finding operation. Under the location finding location, the action data structure can include one or more point locations. The digital assistant interface component 138 can identify the request type as corresponding to the path routing operation. Under the path routing operation, the action data structure can include a single point location. Responsive to the identification, the digital assistant interface component 138 can invoke the path router component 142 to initiate the path routing operation.

The data processing system 102 or the navigator service 106 can execute or run an instance of the location finder component 140 of the navigation application 110. Responsive to the invocation, the location finder component 140 can present the one or more point locations on the portion of the vector-based map 146 visible through the viewport of the navigation application 110. The location finder component 140 can parse the action data structure to identify the indicator. Using the indicator, the location finder component 140 can determine the referential keywords of the input audio signal at the digital assistant application 108 references at least one point location. Responsive to the determination, the location finder component 140 can identify the one or more point locations from the action data structure. For each point location, the location finder component 140 can identify a location identifier corresponding to the point location on the vector-based map 146.

Conversely, the location finder component 140 can determine the referential keywords of the input audio signal at the digital assistant application 108 references at least one point location based on the indicator of the action data structure. In response to the determination, the location finder component 140 can access the vector-based map 146 outside the reference frame. Having accessed the vector-based map 146, the location finder component 140 can search for identifiers of the one or more point locations outside the reference frame. The location finder component 140 can then identify identifiers of the one or more point locations outside the reference frame in the vector-based map 146 matching the referential keywords of the action data structure. For example, the referential keywords "Tower ABC" included in the received action data structure may refer to any of the point locations within the reference frame. In this example, the location finder component 140 can search for point locations matching the identifier the "Tower ABC" in the vector-based map 146 outside the initial reference frame. The location finder component 140 can identify multiple point locations with identifiers matching the referential keywords. Using the location identifier of the client device 104 from the action data structure, the location finder component 140 can identify the point location nearest to the clinet device 104. With the identification of each point location, the location finder component 140 can identify the geographic coordinates for the identified point location.

Responsive to identifying point locations outside the initial reference frame, the location finder component 140 can modify the reference frame to include the point location with the identifier matching the referential keywords. The location finder component 140 can identify the dimensions and coordinates of the initial reference frame in corresponding to the visible portion of the vector-based map 146. The location finder component 140 can move the coordinates of the reference frame to include the coordinates of the point location with the identifier matching the referential keywords. The coordinates of the point location may be, for example, at the center of the new reference frame. The location finder component 140 can also maintain the dimensions of the reference frame. With the reference frame moved, the navigation application 110 can display a different portion of the vector-based map 146 through the viewport. The portion may correspond to the reference frame moved to include the point location with the identifier matching the referential keywords. In this manner, the digital assistant application 108 and the navigation application 110 can be used to present point locations and perform other functions inside and outside the portion of the vector-based map 146 displayed through the viewport. For example, the first voice query parsed by the NLP component 114 may be "Show me Tower ABC." The NLP component 114 may have determined that the first voice query does not refer to any point location currently visible in the vector-based map 146 displayed through the viewport of the navigation application 110. With the referential keywords "Tower ABC," the location finder component 140 can find the point location with the identifier corresponding to "Tower ABC." Subsequently, the second voice query parsed by the NLP component 114 may be "Show me patisseries." The NLP component 114 can determine that some of the point locations now visible on the portion of the vector-based map 146 visible through the viewport are referenced by the referential keyword "patisseries." The location finder component 140 can then highlight the corresponding point location in the portion of the vector-based map 146.

The location finder component 140 can present the point locations corresponding to the location identifiers on the portion of the vector-based map 146 visible through the viewport of the navigation application 110. For example, the location finder component 140 can insert a point or circle or highlight a graphical representation corresponding to the point location on the vector-based map 146. The location finder component 140 can also display the identifiers for the point locations in text. Upon displaying the point locations on the portion of the vector-based map 146 through the viewport, the location finder component 140 can generate a response to provide as text for display or for an output audio signal. The response can include the request type corresponding to the location finding operation. The response can include the identifiers for the point locations displayed within the portion of the vector-based map 146 visible through the viewport of the navigation application 110. The response can also include a number of the displayed point locations. The response can also include at least one response phrase with one or more words for display or for an output audio signal. The response phrase can be defined using a template. For example, the template for the response phrase may be of the form: "[number of point locations] [identifier] found in the area." In generating the response, the location finder component 140 can identify the request type, the identifiers for the displayed point locations, the number of displayed point locations, and the at least one response phrase. Once the response is generated, the digital assistant interface component 138 can send, transmit, or provide the response to the digital assistant application 108.

The data processing system 102 or the navigator service 106 can execute or run an instance of the path router component 142 of the navigation application 110. Responsive to the invocation, the path router component 142 can generate, determine, or identify a travel path to the point location identified in the action data structure. The path router component 142 can identify the current geographic coordinates of the client device 104 running the navigation application 110 using the geolocation sensing component 118. The path router component 142 can convert the geographic coordinates of the client device 104 to a location identifier on the vector-based map 146. The path router component 142 can set the location identifier for the client device 104 as a start location. The path router component 142 can identify the location identifier corresponding to the point location of the action data structure. The path router component 142 can set the location identifier of the point location as a destination location. The path router component 142 can apply pathfinding algorithms (e.g., Djikstra's algorithm, A* algorithm, and Kruskal's algorithm) to determine the travel path between the start location and the destination location on paths of the vector-based map 146. As described above, the vector-based map 146 can include paths corresponding to the transportation networks. The path router component 142 can also present or display at least a part of the travel path on the portion of the vector-based map 146 visible through the viewport of the navigation application 110.

In response to determining the travel path, the path router component 142 can generate a response to provide as text for display or for an output audio signal. The response can include the request type corresponding to the path routing operation. The response can include the identifier for the point location corresponding to the destination location on the vector-based map 146. The response can also include an estimated travel time to the destination location. The response can also include at least one response phrase with one or more words for display or for an output audio signal. The response phrase can be defined using a template. For example, the template for the response phrase may be of the form: "Route found to [destination location]. Estimated time of arrival [estimated travel time]." In generating the response, the location finder component 140 can identify the request type, the identifier for the point location, the estimated travel time, and the at least one response phrase. Once the response is generated, the digital assistant interface component 138 can send, transmit, or provide the response to the digital assistant application 108.

Responsive to receipt of the response from the navigation application 110, the audio signal generator component 122 can parse the response to identify the response phrase for textual output or for an output audio signal. The audio signal generator component 122 can generate an output audio file based on the one or more words of response phrase in the response from the navigator service 106. The audio signal generator component 122 can play (e.g., via the speaker 148 of the client device 104) the output audio file of the one or more words of the response phrase. The digital assistant application 108 can also display the one or more words of the response phrase in text. In generating the textual output or the output audio file, the response selector component 124 can select or identify responses phrases using the policies 132 or the response data 134 maintained on the data repository 126. The policies 132 can be particular to a request type (e.g., the location finding operation or the path routing operation), and can specify the response data 134 for the request type. The response selector component 124 can search the policies 132 for generating the output using the request type of the response from the navigation application 110. Once the policy 132 is identified, the response selector component 124 can match the contents of the response from the navigation application 110 with the response data 134. Responsive to identifying the policy 132 for the location finding operation, the response selector component 124 can match the identifiers for the displayed point locations and the number of displayed point locations into the response data 13 4 for the policy 132. Responsive to identifying the policy 132 for the path routing operation, the response selector component 124 can match the identifier for the point location and the estimated travel time into the response data 134 for the policy 132.

Figure 2:
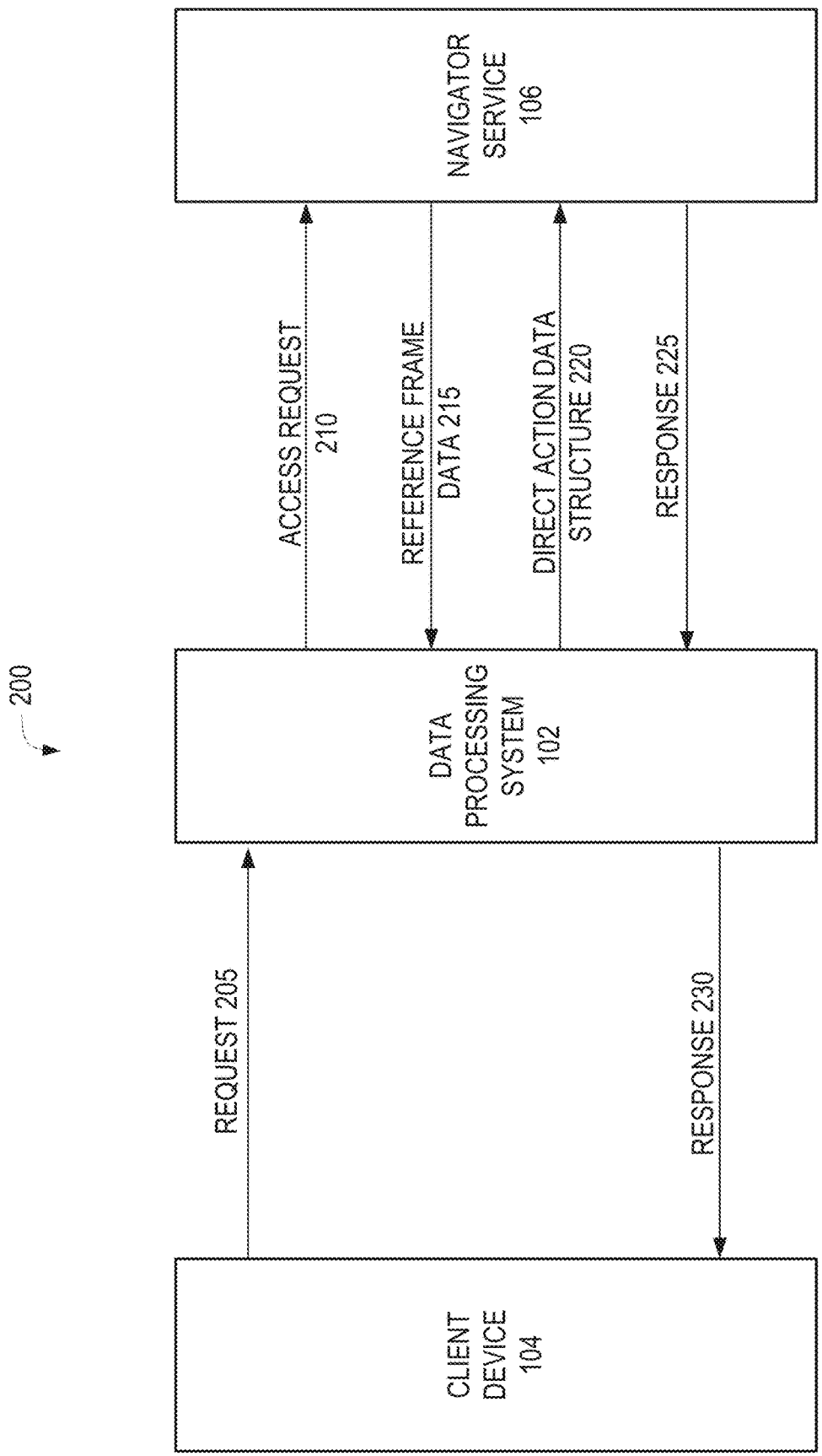
FIG. 2 illustrates a sequence diagram of an example data flow to interface among multiple applications in a networked computer environment in the system illustrated in FIG. 1, in accordance with an example of the present disclosure.

Referring now to FIG. 2, depicted is a sequence diagram of an example data flow 200 to determine operational statuses of navigation applications 110 interfacing with the digital assistant application 108 in the system illustrated in FIG. 1. The data flow 200 can be implemented or performed by the system 100 described above in conjunction with FIG. 1 or system 600 detailed below in conjunction with FIG. 6.

A local instance of the digital assistant application 108 running on the client device 104 can detect an input audio signal via the sensor 158 and perform initial processing on the input audio signal to generate a request 205. The request 205 can include the input audio signal itself or one or more words identified in the input audio signal using machine learning techniques. The client device 104 can transmit the request 205 to the data processing system 102. A remote instance of the digital assistant application 108 running on the data processing system 102 can perform additional processing on the request 205. The NLP component 114 running on the data processing system 102 can parse the request 205 to determine that the request 205 is referencing a function to be performed by the navigation application 110. The NLP component 114 can also identify the request corresponding to the function and referential keywords from the input audio signal using semantic analysis techniques. In response to the determination, the navigation interface component 116 can send an access request 210 to the navigator service 106 (or another client device 104) running the navigation application 110.

Upon receipt of the access request 210, the digital assistant interface component 138 running on the navigator service 106 can identify information visible through the viewport of the navigation application 110. The information can include point locations and identifiers for the point locations of the geographic region represented by the vector-based map 146 visible through the viewport of the navigation application 110. The digital assistant interface component 138 can set the information visible through the viewport of the navigation application 110 as reference frame data 215. The digital assistant interface component 138 can in turn provide the reference frame data 215 to the data processing system 102.

Using the reference frame data 215, the NLP component 114 can use semantic analysis techniques to determine which point location the referential keyword of the input audio signal is denoting. For example, the NLP component 114 can compare the referential keywords with the identifiers of the point locations. With the identification of the point location, the direct action handler component 120 executing on the data processing system 102 can generate a direct action data structure 220. The direct action data structure 220 can include the request type corresponding to the function to be performed by the navigation application 110 (e.g., location finding or path routing). The direct action data structure 220 can also include the point location identified using the referential keyword. The direct action handler component 120 can transmit the direct action data structure 220 to the navigator service 106 (or the client device 104) executing the navigation application 110.

In accordance to the direct action data structure 220, the navigation application 110 can perform the navigation guidance process. The digital assistant interface component 138 can parse the direct action data structure 220 to identify the request type. Using the request type, the digital assistant interface component 138 can invoke one of the location finder component 140 and the path router component 142 running on the navigator service 106. When the request type is identified as corresponding to the location finding function, the location finder component 140 can present the point locations (e.g., via highlighting) on the geographic region displayed through the viewport of the navigation application 110. When the request type is identified as corresponding to the path routing function, the path router component 142 can determine the travel path between a starting location (e.g., the client device 104) to a destination location corresponding to the point location of the direct action data structure 220. The path router component 142 can present a part of the travel path on the geographic region displayed on the viewport of the navigation application 110. The location finder component 140 and the path router component 142 can each generate a response 225 to transmit back to the digital assistant application 108 executing on the data processing system 102. The response 225 can include a response phrase as well as other parameters. Using the response 225, the audio signal generator component 122 can generate another response 230 to provide to the client device 104. Once received, the digital assistant application 108 running on the client device 104 can display the response 230 as text on display or as an audio file outputted through the speaker 148.

Figure 3:
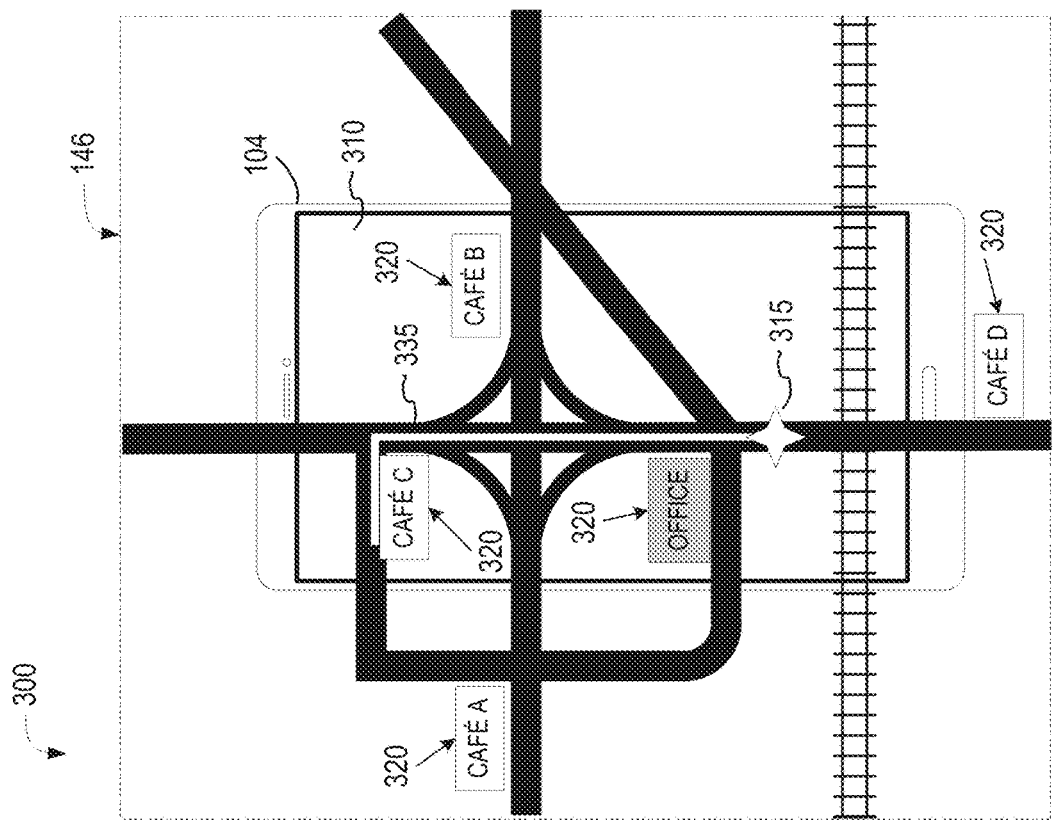
FIG. 3 illustrates a client computing device with request and response messages in relation to a navigational application, in accordance with an example of the present disclosure.
Figure 3:
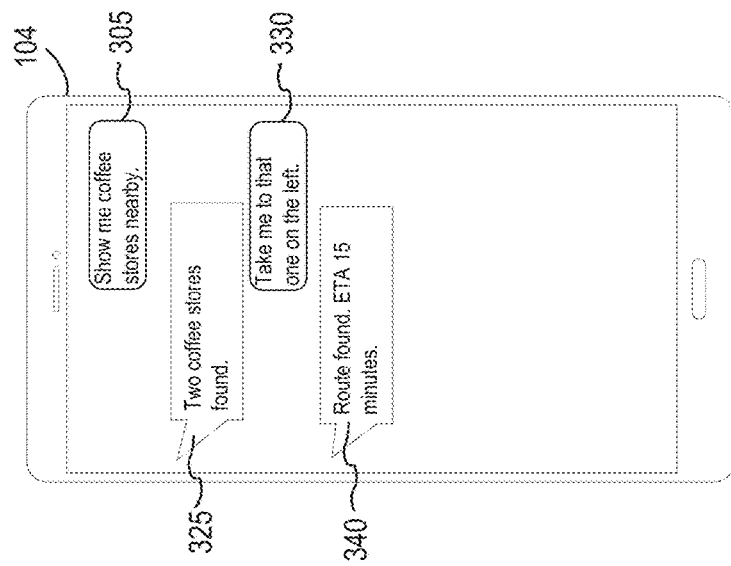

Referring now to FIG. 3, depicted is the client device 104 running the digital assistant application 108 on the left and running the navigation application 110 on the right under configuration 300. The client devices 104 executing the digital assistant application 108 and the navigation application 110 can be the same or different.

The digital assistant application 108 running on the client device 104 on the left can detect an input audio signal via the sensor 158. The digital assistant application 108 can apply natural language processing techniques to identify one or more words in the detected input audio signal. The digital assistant application 108 can display the output as a text content item 305 including the words "Show me coffee stores nearby" identified from the input audio signal. The digital assistant application 108 can determine that the input audio signal is referencing a location finding operation of the navigation application 110. The digital assistant application 108 can identify the words "Show me" as the request and "coffee stores nearby" as the referential keywords. In response to determining that the input audio signal is referencing the location finding operation, the digital assistant application 108 can access the navigation application 110.

The navigation application 110 running on the client device 104 on the right can display a portion of the vector-based map 146 through a viewport 310 of the navigation application 110. The viewport 310 of the navigation application 110 can correspond to a size of the display of the client device 104. The vector-based map 146 can include a set of point locations 320 corresponding to building and a set of paths among the point locations 320 representing the transportation networks, such as the roads and railroads as illustrated. Each point location 320 can have an identifier such as name or a category type of the building, such as "café," "gas station," "hotel," and "office." The navigation application 110 can identify the point locations 320 appearing in the viewport 310, such as the point locations 320 with the identifiers "Café B," "Café C," and "Office." The navigation application 110 can exclude point locations outside the viewport 310, such as the point locations 320 with the identifiers "Café A" and "Café D." The navigation application 110 can display current location 315 of the client device 104 on the vector-based map 146 using a mark (e.g., a four-point star). The navigation application 110 can provide the point locations with the identifiers to the digital assistant application 108.

With the retrieval of the point locations from the navigation application 110, the digital assistant application 108 can perform semantic analysis techniques to identify which point locations the referential keywords are referring to. In the shown example, the digital assistant application 108 may have identified "coffee stores nearby" as the referential keywords. Using the semantic analysis techniques, the digital assistant application 108 can determine that the referential keywords of "coffee stores nearby" are denote the point locations 320 with the identifiers "Café B" and "Café C." The digital assistant application 108 can determine that the referential keywords do not denote the point location 320 with the identifier "Office." With the identification of the point locations 320 having the identifiers "Café B" and "Café C," the digital assistant application 108 can generate the direct action data structure to provide to the navigation application 110. The direct action data structure can have the identified point locations 320 and the request type corresponding to the location finding operation of the navigation application 110. Upon receipt, the navigation application 110 can parse the direct action data structure to identify that the function to be performed is the location finding operation. The navigation application 110 can also parse the direct action data structure to identify the point locations 320 with the identifiers "Café B" and "Café C." Based on these identifications, the navigation application 110 can highlight the buildings representing the point locations 320 with the identifiers "Café B" and "Café C." In addition, the navigation application 110 can generate and send a response back to the digital assistant application 108. The response can include a response phrase, "Two coffee stores found." The digital assistant application 108 can in turn display a text content item 325 on the screen of the client device 104.

Subsequently, the digital assistant application 108 can detect another input audio signal via the sensor 158. The digital assistant application 108 can apply natural language processing techniques to identify one or more words in the detected input audio signal. The digital assistant application 108 can display the output as a text content item 330 including the words "Take me to that one on the left" identified from the input audio signal. The digital assistant application 108 can determine that the input audio signal is referencing a path routing operation of the navigation application 110. Using natural language processing techniques, the digital assistant application 108 can identify the words "Take me" as the request, "that one" as the referential keyword, and "on the left" as the auxiliary keywords. With the point locations previously retrieved from the navigation application 110, the digital assistant application 108 can identify that the referential keyword together with the auxiliary keywords denote the point location 320 with the identifier "Café C" that appears on the left of the viewport 310. Based on the identification of the point location 320 with the identifier "Café C," the generate the direct action data structure to provide to the navigation application 110. The direct action data structure can have the identified point location 320 and the request type corresponding to the path routing operation of the navigation application 110. Upon receipt, the navigation application 110 can parse the direct action data structure to identify that the function to be performed is the path routing operation. The navigation application 110 can also parse the direct action data structure to identify the point location 320 with the identifier "Café C," and can set the point location 320 as a destination location. The navigation application 110 can also identify a current location of the client device 104 as a starting location. Based on these identifications, the navigation application 110 can determine a travel path 335 through the vector-based map 146 using pathfinding algorithms. Based on the travel path 335, the navigation application 110 can determine an estimate time of arrival. The navigation application 110 can render and display the travel path 335 on the vector-based map 146. In addition, the navigation application 110 can generate and send a response back to the digital assistant application 108. The response can include a response phrase, "Round found. ETA 15 minutes." The digital assistant application 108 can in turn display a text content item 340 on the screen of the client device 104.

Figure 4:
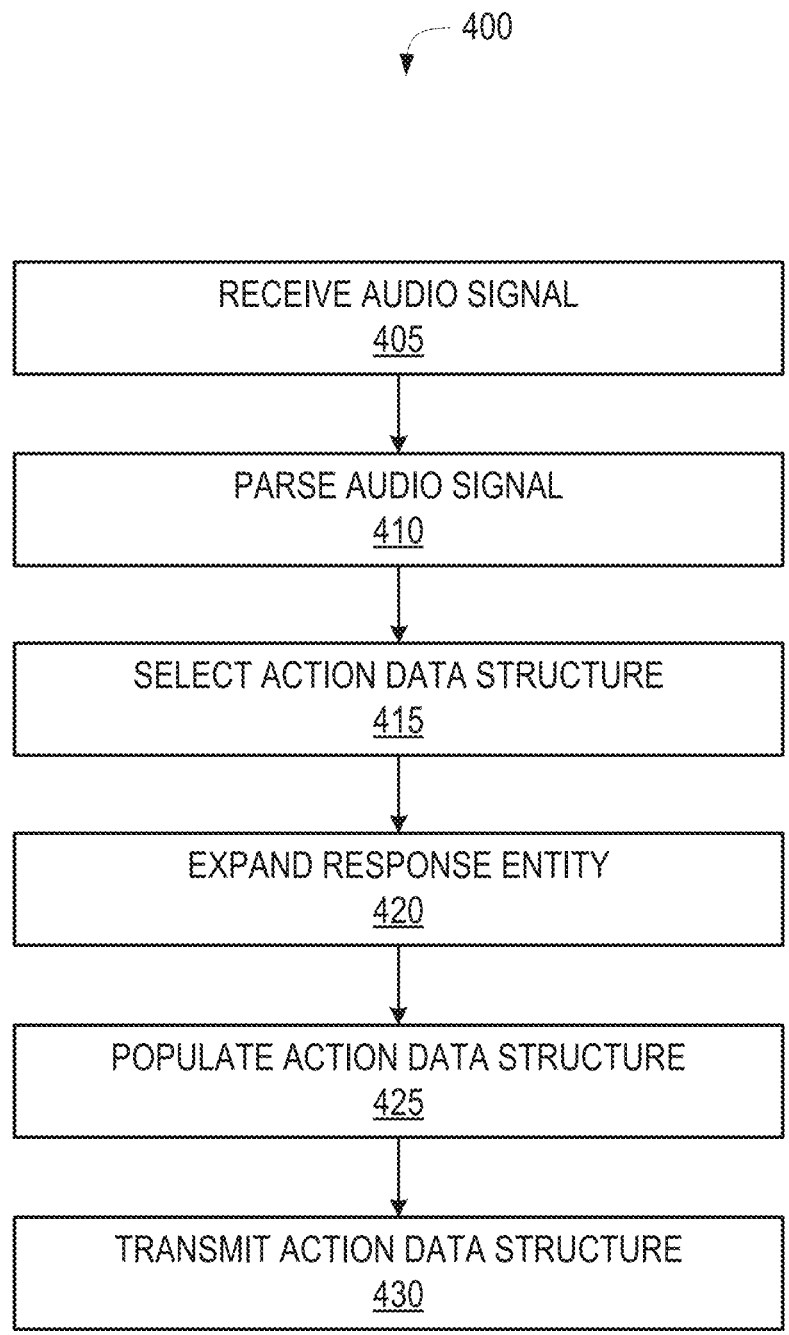
FIG. 4 illustrates a flow diagram of a method to generate voice-activated threads in a networked computer environment, in accordance with an example of the present disclosure.

FIG. 4 illustrates a block diagram of an example method 400 to generate voice-activated threads in a networked computer environment. The method 400 can be implemented or executed by the system 100 described above in conjunction with FIGS. 1-3 or system 600 detailed below in conjunction with FIG. 6. The method can include receiving an input audio signal (405). The method 400 can include parsing the input audio signal (410). The method 400 can include selecting an action data structure (415). The method 400 can include expanding a response entity (420). The method can include populating the action data structure (425). The method 400 can include transmitting the digital component (430).

The method 400 can include receiving an input signal (405). The method can include receiving, by an NLP component executed by a data processing system, the input signal. The input signal can be an input audio signal that is detected by a sensor at a first client device and transmitted to the data processing system. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system can receive the audio input for a session corresponding to the conversation.

The method 400 can include parsing the input signal (410). The NLP component of the data processing system can parse the input signal to identify a request. The NLP component can identify at least one entity in the input signal. The request can be an intent or request that can be fulfilled by one or more service provider devices. The request can be a part of a conversational phrase. For example, the request can be "Ok, order a car to take me home." The entities identified by the NLP component can be phrases or terms in the request that map to input fields or types the service provider device requests when fulfilling a request. For example, the service provider device providing the car service may request a current location input field and a destination input field. Continuing the above example, the NLP component can map the term "home" to the destination input field.

The method 400 can include selecting an action data structure (415). The data processing system can select the action data structure based on the request parsed from the input signal. The data processing system can select the action data structure based on the service provider device that can fulfill the request. The action data structure can be a data structure or object that is created by the service provider device. The service provider device can provide the action data structure to the data processing system. The action data structure can indicate fields, data, or information that the service provider device uses to fulfill requests. The service provider device can flag one or more of the fields to request that the data processing system expand the entity returned for that field. When a field is flagged for expansion, the data processing system can design and generate conversation-based data exchanges with the client device 104 to retrieve information or data for the flagged field rather than the service provider device 160 designing the conversation-based data exchange.

The method 400 can include expanding the response entity (420). The data processing system can determine the entity mapped to the input field needs to be expanded if the entity is not in a format specified by the service provider device. Continuing the above example, the NLP component can determine "home" is the entity mapped to a destination. The direct action handler component can determine to update the action data structure to include the entity "home" in a destination field. The direct action handler component can determine the format of the response entity does not match the format of the destination field. For example, the destination field can have the format of an object that requests a street address, city, state, and zip code. Detecting a mismatch between the format of the response entity and the format of the field, the data processing system can expand the entity to a street address, city, state, and zip code format. For example, the data processing system can look up the address the end user provided the data processing system as the end user's "home" address. The data processing system can expand the entity based on an expansion policy. The expansion policy can indicate whether the data processing system has permission to expand the term or can indicate what end user or client computing device provided data can be included in an expanded entity.

The data processing system can expand the entity based on a request from a service provider device. For example, the data processing system can generate a first action data structure with the unexpanded entity. The data processing system can transmit the first action data structure to the service provider device for processing to fulfill the request. The service provider device can return the action data structure (or a portion thereof) to the data processing system if the service provider device cannot process or understand the data in on or more of the action data structure's fields. For example, the service provider device can attempt to process the "home" entity in the destination field and then request the data processing system expand the "home" entity after the service provider device determines that it cannot process or understand the entity.

The method 400 can include populating the action data structure (425). The direct action handler component can populate the action data structure with the expanded entity. The direct action handler component can populate the action data structure with the entity. For example, the action data structure can be an object into which the entity or expanded entity is stored. Populating the action data structure can also be referred to update the action data structure.

The method 400 can include transmitting the action data structure (430). The data processing system can transmit the populated action data structure to the service provider device. Upon receipt of the action data structure, the service provider device can fulfill the request or request additional information from the data processing system or client computing device.

Figure 5:
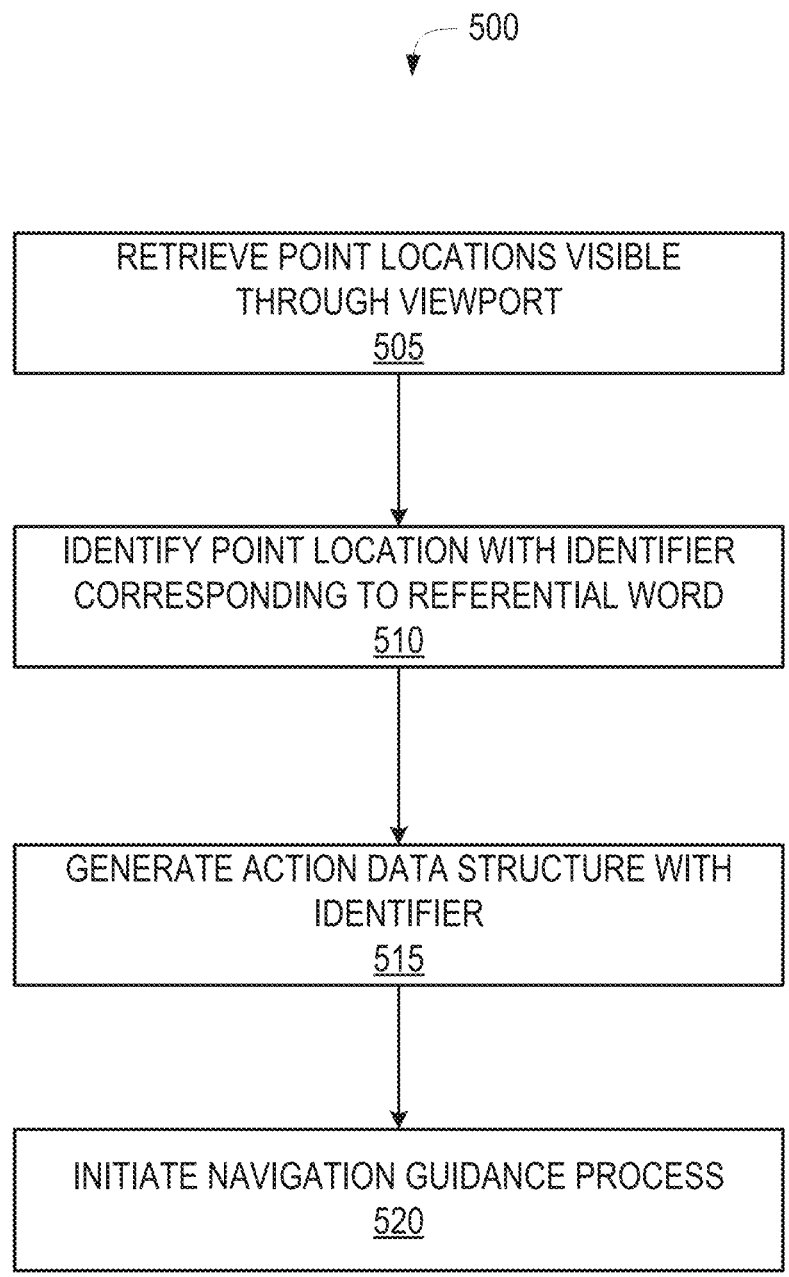
FIG. 5 illustrates a flow diagram of a method to interface among multiple applications in a networked computer environment using the example system illustrated in FIG. 1, in accordance with an example of the present disclosure.

Referring now to FIG. 5, depicted is an example method 500 to interface among multiple applications in a networked computer environment. The method 500 can be implemented or executed by the system 100 described above in conjunction with FIGS. 1-3 or system 600 detailed below in conjunction with FIG. 6. In brief overview, the method 500 can include retrieving point location visible through a viewport (505). The method 500 can include identifying a point location with identifier corresponding to a referential word (510). The method 500 can include generating an action data structure with the identifier (515). The method 500 can include initiating a navigation guidance process (520).

The method 500 can include retrieving point location visible through a viewport (505). The data processing system (e.g., the data processing system 102) executing a digital assistant application can identify a request and a referential word parsed from an input audio signal using natural language processing techniques. The data processing system can determine that the request is referring to a function of a navigation application running on a client device. The function can include a location finding function and a path routing function. In response to determining that the request is referring to a function of the navigation application, the data processing system can access the navigation application to retrieve point locations on a geographic region displayed through a viewport of the navigation application. Each point location can correspond to a feature on the geographic region, and can have an identifier.

The method 500 can include identifying a point location with identifier corresponding to a referential word (510). With the retrieval of the point locations displayed through the viewport of the navigation application, the data processing system can identify which point location the referential word of the input audio signal is referring to. The data processing system can use semantic analysis techniques to identify which identifier corresponding to the point location the referential word is denoting. The semantic analysis techniques can include using a semantic knowledge graph, performing deixis analysis, and generating n-grams, among others.

The method 500 can include generating an action data structure with the identifier (515). The data processing system can use the identified request and the point location to generate the action data structure in accordance to a template. The request can correspond to one of the functions of the navigation application. The point location can include the one corresponding to the referential word parsed from the input audio signal. The action data structure can also include an account identifier and an authentication credential, among others.

The method 500 can include initiating a navigation guidance process (520). The data processing system can send the action data structure to the navigation application to initiate the navigation guidance process. The navigation guidance process can include the location finding operation and the path routing operation. The location finding operation can include presenting or displaying a graphical representation of the point locations corresponding to identifiers in the action data structure. The path routing operation can include determining and presenting a travel route between a current location and a destination location corresponding to the point location corresponding to the identifier in the action data structure.

Figure 6:
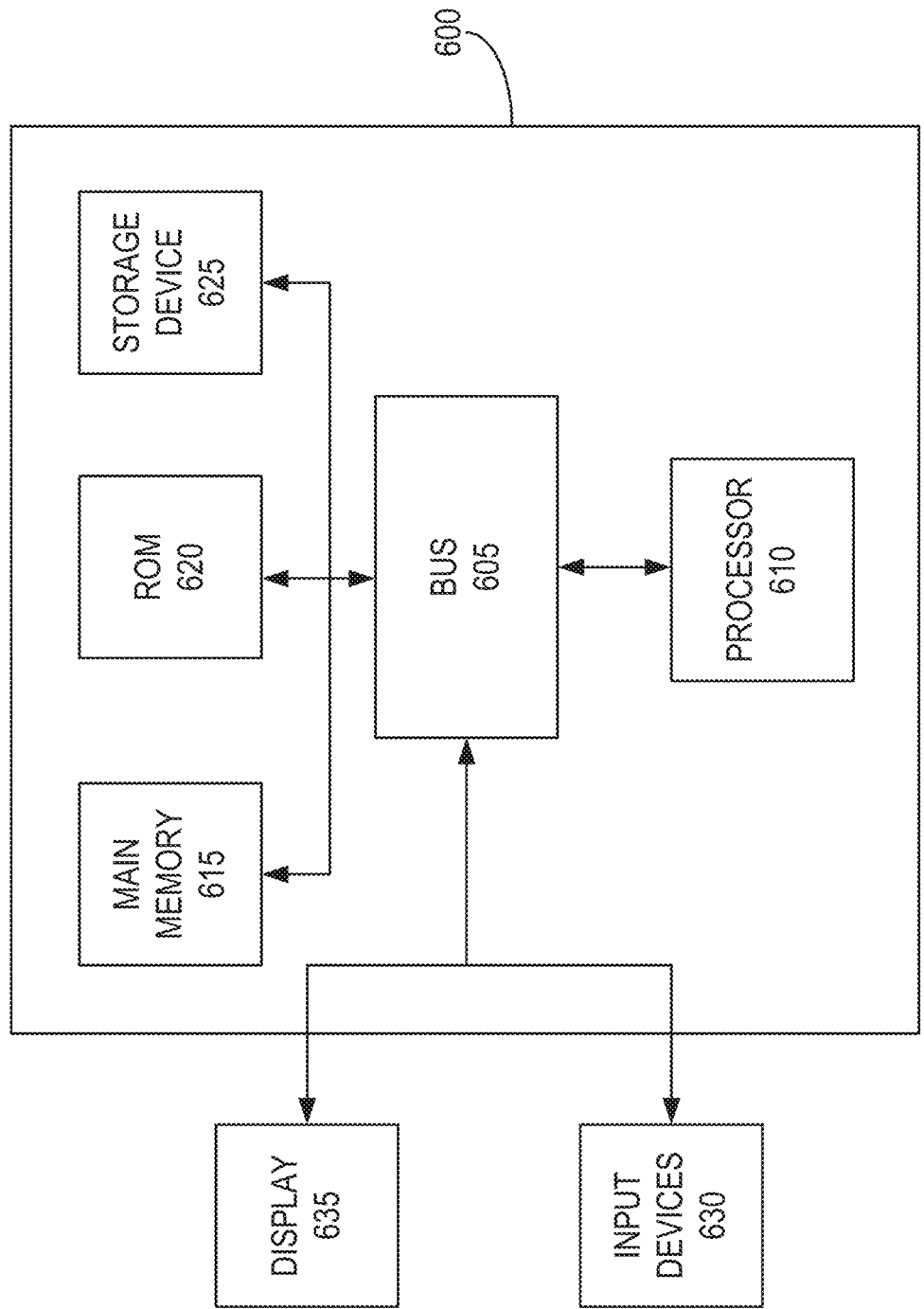
FIG. 6 is a block diagram of an example computer system.

FIG. 6 is a block diagram of an example computer system 600. The computer system or computing device 600 can include or be used to implement the system 100 or its components such as the data processing system 102. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information and instructions to be executed by the processor 610. The main memory 615 can be or include the data repository 126 or 148. The main memory 615 can also be used for storing position information, temporary variables, or other intermediate information during execution of instructions by the processor 610. The computing system 600 may further include a read-only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repositories 126 or 144.

The computing system 600 may be coupled via the bus 605 to a display 635, such as a liquid crystal display or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 102, the client devices 104, or other components of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 156). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104 or the navigator service 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114 and the direct action handler component 122 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to interface among multiple applications in a networked computer environment, comprising:
    a navigation interface component, a natural language processor component, and an action handler component that are executed on a data processing system having one or more processors;
    the natural language processor component to:
        receive, while a display of a first client device is rendering a viewport of a navigation application executing on the first client device, an input audio signal detected by a sensor of at least one of the first client device and a second client device; and
        parse the input audio signal to identify a request and a referential word;
    responsive to the natural language processor component identifying the request:
        the navigation interface component to access the navigation application executing on the first client device to retrieve a plurality of point locations within a reference frame corresponding to a geographic region displayed in the viewport of the navigation application when the input audio signal is received, the viewport corresponding to an area of a display of the first client device through which the reference frame is visible, and each point location of the plurality of locations being visible in the viewport and having an identifier, wherein the reference frame corresponding to the geographic region displayed in the viewport is different from a previously presented reference frame corresponding to a current location of the first client device; and
        the natural language processor component to identify a point location from the retrieved plurality of point locations within the reference frame based on the referential word parsed from the input audio signal and the identifier for the point location; and
    the action handler component to:
        generate an action data structure including the point location identified responsive to the detection of the input audio signal; and
        transmit the action data structure to the first client device to cause the navigation application to initiate a navigation guidance process using the point location.

2. The system of claim 1, comprising:
the navigation interface component to access the navigation application to determine a first portion of the reference frame corresponding to the geographic region displayed concurrently to the receipt of the input audio signal and to determine a second portion of the reference frame corresponding to the geographic region previously displayed in the viewport based on a velocity of the first client device acquired from an inertial motion unit.

3. The system of claim 1, comprising:
the natural language processor component to identify the point location from the plurality of point locations within the reference frame based on a travel direction of at least one of the first client and the second client device determined using data from an inertial motion unit.

4. The system of claim 1, comprising:
the navigation interface component to access the navigation application to retrieve the plurality of point locations within the reference frame, the reference frame having a first portion corresponding to the geographic region and a second portion corresponding to a second geographic region within a defined proximity about a destination location of a path routing operation of the navigation guidance process; and
the natural language processor component to:
    determine that the referential word is related to the second portion corresponding to the second geographic region and not to the first portion corresponding to the geographic region; and
    identify the point location from the plurality of point locations within the portion based on the determination that the referential word is related to the second portion.

5. The system of claim 1, comprising:
the navigation interface component to access the navigation application to retrieve a first location identifier of the first client device within the reference frame corresponding to the geographic region and a plurality of second location identifiers corresponding to the plurality of point locations within the reference frame; and
the natural language processor component to identify the point location from the plurality of point locations based on the first location identifier of the first client device and the plurality of second location identifiers corresponding to the plurality of point locations.

6. The system of claim 1, comprising:
the navigation interface component to access the navigation application to retrieve a plurality of search terms received within a defined time window prior to the receipt of the input audio signal; and the natural language processor component to:
determine, for each point location of the plurality of point locations and each search term of the plurality of search terms, a semantic distance between the identifier of the point location and the search term using a semantic knowledge graph; and
select, for the identification of the point location, a subset of point locations from the plurality of point locations based on the plurality of semantic distances between the plurality of identifiers and the plurality of search terms.

7. The system of claim 1, comprising the natural language processor component to:
parse the input audio signal to identify an auxiliary word different from the referential word;
determine a subset area of the viewport of the navigation application based on the auxiliary word; and
select, for the identification of the point location, a subset of point locations from the plurality of point locations corresponding to the subset area of the viewport determined based on the auxiliary word.

8. The system of claim 1, comprising the natural language processor component to:
receive a second input audio signal detected by the sensor of at least one of the first client and the second client device;
determine that a time elapsed between the receipt of the second input audio signal and the receipt of the input audio signal is less than a defined threshold;
parse, responsive to the determination that the elapsed time is less than the defined threshold, the second input audio signal to identify a second referential word; and
select, for the identification of the point location, a subset of point locations from the plurality of point locations based on the second referential word.

9. The system of claim 1, comprising the natural language processor component to:
determine, for each point location of the plurality of point location, an indexical measure between the referential word and the identifier for the point location, the indexical measure indicating a likelihood that the referential word denotes the identifier for the point location; and
identify the point location from the plurality of point locations within the reference frame based on the plurality of indexical measures for the corresponding plurality of point locations.

10. The system of claim 1, comprising the natural language processor component to:
determine, for each point location of the plurality of point locations, a semantic distance between the referential word and the identifier of the point location using a semantic knowledge graph; and
identify the point location from the plurality of point locations within the reference frame based on the plurality of semantic distances for the corresponding plurality of point locations.

11. The system of claim 1, comprising:
the natural language processor component to determine a request type corresponding to a location finder operation of a plurality of operations to be performed by the navigation application based on the request; and
the action handler component to generate the action data structure including the request type and to transmit the action data structure to the first client device to cause the navigation application to initiate the location finder operation of the navigational guidance process corresponding to the request type to present the point location in the geographic region displayed in the viewport.

12. The system of claim 1, comprising:
the natural language processor component to determine a request type corresponding to a path routing operation of a plurality of operations to be performed by the navigation application based on the request; and
the action handler component to generate the action data structure including the request type and to transmit the action data structure to the first client device to cause the navigation application to initiate the path routing operation of the navigational guidance process corresponding to the request type to identify a travel path to the point location as a destination location.

13. The system of claim 1, comprising the action handler component to receive a response from the first client device executing the navigation application for at least one of a textual output or an output audio signal.

14. A method of interfacing among multiple applications in a networked computer environment, comprising:
receiving, by a data processing system having one or more processors, while a display of a first client device is rendering a viewport of a navigation application executing on the first client device, an input audio signal detected by a sensor of at least one of the first client device and a second client device;
parsing, by the data processing system, the input audio signal to identify a request and a referential word;
responsive to identifying the request:
accessing, by the data processing system, the navigation application executing on the first client device to retrieve a plurality of point locations within a reference frame corresponding to a geographic region displayed in the viewport of the navigation application when the input audio signal is received, the viewport corresponding to an area of the display of the first client device through which the reference frame is visible, and each point location of the plurality of locations being visible in the viewport and having an identifier, wherein the reference frame corresponding to the geographic region displayed in the viewport is different from a previously presented reference frame corresponding to a current location of the first client device; and
identifying, by the data processing system, a point location from the retrieved plurality of point locations within the reference frame based on the referential word parsed from the input audio signal and the identifier for the point location;
generating, by the data processing system, an action data structure including the point location identified responsive to the detection of the input audio signal; and
transmitting, by the data processing system, the action data structure to the first client device to cause the navigation application to initiate a navigation guidance process using the point location.

15. The method of claim 14, comprising:
identifying, by the data processing system, a measured velocity of the first client device based on data acquired from an inertial motion unit; and
accessing, by the data processing system, the navigation application to determine a first portion of the reference frame corresponding to the geographic region displayed concurrently to the receipt of the input audio signal and to determine a second portion of the reference frame corresponding to the geographic region previously displayed in the viewport based on the measured velocity of the first client device.

16. The method of claim 14, comprising:

accessing, by the data processing system, the navigation application to retrieve the plurality of point locations within the reference frame, the reference frame having a first portion corresponding to the geographic region and a second portion corresponding to a second geographic region within a defined proximity about a destination location of a path routing operation of the navigation guidance process;

determining, by the data processing system, that the referential word is related to the second portion corresponding to the second geographic region and not to the first portion corresponding to the geographic region; and identifying, by the data processing system, the point location from the plurality of point locations within the portion based on the determination that the referential word is related to the second portion.

17. The method of claim 14, comprising:

accessing, by the data processing system, the navigation application to retrieve a first location identifier of the first client device within the reference frame corresponding to the geographic region and a plurality of second location identifiers corresponding to the plurality of point locations within the reference frame; and identifying, by the data processing system, the point location from the plurality of point locations based on the first location identifier of the first client device, and the plurality of second location identifiers corresponding to the plurality of point locations.

18. The method of claim 14, comprising:

accessing, by the data processing system, the navigation application to retrieve a plurality of search terms received within a defined time window prior to the receipt of the input audio signal;

determining, by the data processing system, for each point location of the plurality of point locations and each search term of the plurality of search terms, a semantic distance between the identifier of the point location and the search term using a semantic knowledge graph; and selecting, by the data processing system, for identifying the point location, a subset of point locations from the plurality of point locations based on the plurality of semantic distances between the plurality of identifiers and the plurality of search terms.

19. The method of claim 14, comprising:

determining, by the data processing system, a request type corresponding to a location finder operation of a plurality of operations to be performed by the navigation application based on the request; and generating, by the data processing system, the action data structure including the request type and to transmit the action data structure to the first client device to cause the navigation application to initiate the location finder operation of the navigational guidance process corresponding to the request type to present the point location in the geographic region displayed in the viewport.

20. The method of claim 14, comprising:

determining, by the data processing system, a request type corresponding to a path routing operation of a plurality of operations to be performed by the navigation application based on the request; and generating, by the data processing system, the action data structure including the request type and to transmit the action data structure to the first client device to cause the navigation application to initiate the path routing operation of the navigational guidance process corresponding to the request type to identify a travel path to the point location as a destination location.

* * * * *